(12) United States Patent
Hong et al.

(10) Patent No.: US 11,993,316 B2
(45) Date of Patent: May 28, 2024

(54) VEHICLE BODY STRUCTURE

(71) Applicants: Hyundai Motor Company, Seoul (KR); Kia Corporation, Seoul (KR)

(72) Inventors: Deok Hwa Hong, Gyeonggi-do (KR); Il Do Kim, Gyeonggi-do (KR); Byeong Cheon Lee, Seoul (KR); Kwang Hee An, Gyeonggi-do (KR); Ji Woong Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 126 days.

(21) Appl. No.: 17/751,967

(22) Filed: May 24, 2022

(65) Prior Publication Data

US 2023/0076155 A1    Mar. 9, 2023

(30) Foreign Application Priority Data

Aug. 27, 2021    (KR) .................. 10-2021-0114281

(51) Int. Cl.
*B62D 27/02*    (2006.01)
*B62D 25/02*    (2006.01)
*B62D 25/04*    (2006.01)
*B62D 25/20*    (2006.01)

(52) U.S. Cl.
CPC ......... *B62D 27/023* (2013.01); *B62D 25/025* (2013.01); *B62D 25/04* (2013.01); *B62D 25/2018* (2013.01)

(58) Field of Classification Search
CPC .. B62D 25/025; B62D 25/04; B62D 25/2018; B62D 25/20; B62D 25/2009; B62D 27/023
USPC .............................. 296/29, 204, 193.06, 209
See application file for complete search history.

(56) References Cited

U.S. PATENT DOCUMENTS

| | | | |
|---|---|---|---|
| 6,273,486 B1* | 8/2001 | Ezzat ..................... | B62D 27/00 296/203.02 |
| 6,547,318 B2* | 4/2003 | Takeuchi ........... | B62D 25/2045 296/29 |
| 10,392,052 B2* | 8/2019 | Takahashi .............. | B62D 21/15 |
| 11,027,780 B2* | 6/2021 | Ayukawa ............. | B62D 25/082 |

* cited by examiner

*Primary Examiner* — Dennis H Pedder
(74) *Attorney, Agent, or Firm* — Fox Rothschild LLP

(57) ABSTRACT

A vehicle body structure includes: a front pillar; a front side member located in front of the front pillar and extending in a longitudinal direction of the vehicle; a side sill connected to a bottom end of the front pillar; and a rear lower member connecting the front side member, the side sill, and the front pillar, where the rear lower member includes a front connection portion connected to a rear portion of the front side member, and a rear connection portion connected to a lower portion of the front pillar and a front portion of the side sill, and the rear connection portion includes an upper engagement wall joined to the front pillar, and a lower engagement wall joined to the side sill.

20 Claims, 31 Drawing Sheets

VEHICLE BODY STRUCTURE

CROSS-REFERENCE TO RELATED APPLICATION

This application claims under 35 U.S.C. § 119(a) the benefit of Korean Patent Application No. 10-2021-0114281, filed on Aug. 27, 2021 in the Korean Intellectual Property Office, the entire contents of which are incorporated herein by reference.

BACKGROUND

(a) Technical Field

The present disclosure relates to a vehicle body structure, more particularly, to the vehicle body structure capable of improving stiffness of a vehicle body by firmly connecting a front side member, a front pillar, and a side sill.

(b) Description of the Related Art

As is well known in the art, a vehicle body structure includes a dash panel by which a front compartment and a passenger compartment are divided, and a pair of front side members which are disposed in front of the dash panel. The pair of front side members may be spaced apart from each other in a width direction of the vehicle in a front of the vehicle, and a pair of side sills may be connected to the pair of front side members through a pair of rear lower members, respectively. A front portion of each side sill may be connected to a rear portion of a corresponding front side member through a corresponding rear lower member. A pair of front pillars (for example, A-pillars) may be joined to both side edges of the dash panel, respectively. Specifically, each rear lower member may connect the corresponding side sill and the corresponding front pillar on the underbody of the vehicle body structure, thereby increasing stiffness of the vehicle body and defining load paths. In particular, in electric vehicles, as the removal of members is required due to a battery assembly connected to a bottom of a floor, connection of the rear lower member, the side sill, and the front pillar is recognized as more important.

In recent years, in order to achieve weight reduction of vehicles, the front pillar, the rear lower member, and the side sill may be made of an aluminum-based material. In general, the rear lower member may be manufactured by aluminum casting. The side sill may be made of various materials such as steel and aluminum, and may have various closed cross-sections by taking its production conditions into consideration. The front pillar may be manufactured by various manufacturing methods such as casting and press forming.

Meanwhile, the sizes and shapes of the front pillar, the side sill, and the rear lower member may vary according to different models of vehicles, and accordingly the manufacturing costs thereof may increase. For example, the manufacturing cost of the front pillar may relatively increase due to changes in design matching, the manufacturing cost of the rear lower member may significantly increase due to changes in matching with peripheral parts/components and changes in chassis layout, and the manufacturing cost of the side sill may increase due to changes in space of the passenger compartment and adjustment of specification.

The above information described in this background section is provided to assist in understanding the background of the inventive concept, and may include any technical concept which is not considered as the prior art that is already known to those skilled in the art.

SUMMARY

An aspect of the present disclosure provides a vehicle body structure capable of improving stiffness of a vehicle body by firmly connecting a front side member, a front pillar, and a side sill. In particular, the vehicle body structure includes a rear lower member which is designed to fit a front pillar and a side sill for different models of vehicles in the same assembly position using the same assembly method, and thus the manufacturing cost thereof may be reduced.

According to an aspect of the present disclosure, a vehicle body structure may include: a front pillar; a front side member located in front of the front pillar and extending in a longitudinal direction of the vehicle; a side sill connected to a bottom end of the front pillar; and a rear lower member connecting the front side member, the side sill, and the front pillar. The rear lower member may include a front connection portion connected to a rear portion of the front side member, and a rear connection portion connected to a lower portion of the front pillar and a front portion of the side sill. The rear connection portion may include an upper engagement wall joined to the front pillar, and a lower engagement wall joined to the side sill.

The front connection portion of the rear lower member may be connected to the front side member, and the rear connection portion of the rear lower member may be connected to the front pillar and the side sill so that the rear lower member may firmly connect the front side member, the front pillar, and the side sill, thereby improving stiffness of the vehicle body and reliably defining load paths.

The upper engagement wall and the lower engagement wall may have a same shape and a same dimension between difference models of vehicles.

As the upper engagement wall and the lower engagement wall have the same shape and the same dimension between difference models of vehicles, the rear lower member may be joined to a front pillar and a side sill for different models of vehicle in the same assembly position using the same assembly method, thereby flexibly responding to the production of various models of vehicles and reducing the manufacturing cost thereof.

The front connection portion may have two or more walls matching at least two walls of the front side member.

Accordingly, a front portion of the rear lower member may be firmly connected to the rear portion of the front side member.

The rear lower member may include an upper connection portion connecting the front side member and the front pillar, and a lower connection portion connecting the front side member and the side sill.

As the rear lower member connects the front side member and the front pillar through the upper connection portion, and connects the front side member and the side sill through the lower connection portion, connection stiffness of the front side member, the front pillar, and the side sill may be improved.

The upper connection portion may include a plurality of upper ribs extending between the front side member and the front pillar in the longitudinal direction of the vehicle.

The upper connection portion may transfer a load between the front side member and the front pillar through the plurality of upper ribs, thereby defining an upper load path on an upper portion of the rear lower member.

The lower connection portion may include a plurality of lower ribs extending between the front side member and the side sill in the longitudinal direction of the vehicle.

The lower connection portion may transfer a load between the front side member and the side sill through the plurality of lower ribs, thereby defining a lower load path on a lower portion of the rear lower member.

The side sill may have a closed cross section in which a plurality of cavities are defined. The lower engagement wall of the rear lower member may be joined to an inboard sidewall of the side sill, and at least a portion of the inboard sidewall and at least a portion of a bottom wall of the side sill may have a common area having the same shape and the same dimension as those of a side sill for different models of vehicles.

As the inboard sidewalls and the bottom walls of the side sills for different models of vehicles have the common area having the same shape and the same dimension, the rear lower member may be joined to the common area of each side sill in the same assembly position using the same assembly method, thereby flexibly responding to the production of various models of vehicles. Thus, productivity improvement and manufacturing cost reduction may be effectively achieved.

The front pillar may include an upper engagement portion joined to the upper engagement wall of the rear lower member, and a lower engagement portion joined to the front portion of the side sill.

The front pillar may be firmly connected to the rear lower member and the side sill through the upper engagement portion and the lower engagement portion, thereby improving connection stiffness between the rear lower member and the side sill and securing load paths.

The lower engagement portion may have an L-shaped cross section matching the top wall and the outboard sidewall of the side sill.

As the lower engagement portion of the front pillar has the L-shaped cross section, interference between the front pillar and the side sill may be prevented during the assembly thereof, and the positioning of the front pillar and the side sill may be accurately performed, and thus ease of assembly thereof may be improved.

The vehicle body structure may further include an outer reinforcement joined to the rear lower member to cover the outboard side of the rear lower member, and the rear lower member may have flanges joined to edges of the outer reinforcement.

The outer reinforcement may be joined to the outboard side of the rear lower member, thereby improving stiffness with respect to the outboard side of the rear lower member. In particular, the outer reinforcement may firmly connect the rear portion of the front side member to the front pillar and the side sill.

The outer reinforcement may include a front engagement portion joined to the rear portion of the front side member.

As the outer reinforcement is joined to the rear portion of the front side member through the front engagement portion, the front side member may be more firmly connected to the rear lower member.

The vehicle body structure may further include a side sill reinforcement closing an open front end of the side sill, and the side sill reinforcement may have at least one engagement portion joined to at least one of the outer reinforcement and the front pillar.

The side sill reinforcement may be joined to the open front end of the side sill, thereby improving stiffness with respect to the front portion of the side sill. The side sill reinforcement may connect the side sill to the outer reinforcement and/or the front pillar more firmly.

The outer reinforcement may include a first rear engagement portion joined to the front pillar and a second rear engagement portion joined to the side sill reinforcement, and the first rear engagement portion and the second rear engagement portion may partially overlap.

As the first rear engagement portion and the second rear engagement portion of the outer reinforcement partially overlap, the outer reinforcement may connect the front pillar and the side sill reinforcement more firmly.

The side sill reinforcement may include a plurality of flanges joined to the side sill, a top engagement portion joined to the front pillar, and a front engagement portion joined to the outer reinforcement, and the top engagement portion and the front engagement portion may partially overlap.

As the top engagement portion and the front engagement portion of the side sill reinforcement partially overlap, the side sill reinforcement may connect the front pillar and the outer reinforcement more firmly.

The vehicle body structure may further include a pillar reinforcement joined to the lower portion of the front pillar, and the pillar reinforcement may have at least one engagement portion joined to at least one of the side sill and the rear lower member.

The pillar reinforcement may be joined to the lower portion of the front pillar, thereby improving stiffness with respect to the lower portion of the front pillar. The pillar reinforcement may connect the front pillar to the side sill and/or the rear lower member more firmly.

The pillar reinforcement may include a top engagement portion joined to the lower portion of the front pillar, a bottom engagement portion joined to the side sill, and an inboard-side engagement portion joined to the rear lower member.

As the pillar reinforcement is joined to the front pillar, the side sill, and the rear lower member, the pillar reinforcement may improve connection stiffness of the front pillar, the side sill, and the rear lower member.

The inboard-side engagement portion may include a first overlap portion which is overlapped by the top engagement portion, and a second overlap portion which is overlapped by the bottom engagement portion. The first overlap portion may be interposed between the upper engagement portion of the front pillar and the upper engagement wall of the rear lower member, and the second overlap portion may be interposed between the lower engagement wall of the rear lower member and the side sill.

As the first overlap portion of the inboard-side engagement portion is interposed between the front pillar and the rear lower member, connection stiffness between the front pillar and the rear lower member may be improved, and as the second overlap portion of the inboard-side engagement portion is interposed between the rear lower member and the side sill, connection stiffness between the rear lower member and the side sill may be improved.

The vehicle body structure may further include a reinforcing member interposed between the upper engagement wall of the rear connection portion, the side sill, and the front pillar.

The rear connection portion may further include a connection wall connecting the upper engagement wall and the lower engagement wall.

The vehicle body structure may further include a reinforcing member interposed between a portion of the upper engagement wall of the rear connection portion, the connection wall of the rear connection portion, a portion of the lower engagement wall of the rear connection portion, the side sill, and the front pillar.

The rear connection portion of the rear lower member may further include a reinforcing rib extending from the lower engagement wall toward the side sill, and the reinforcing rib may be joined to a top wall of the side sill.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
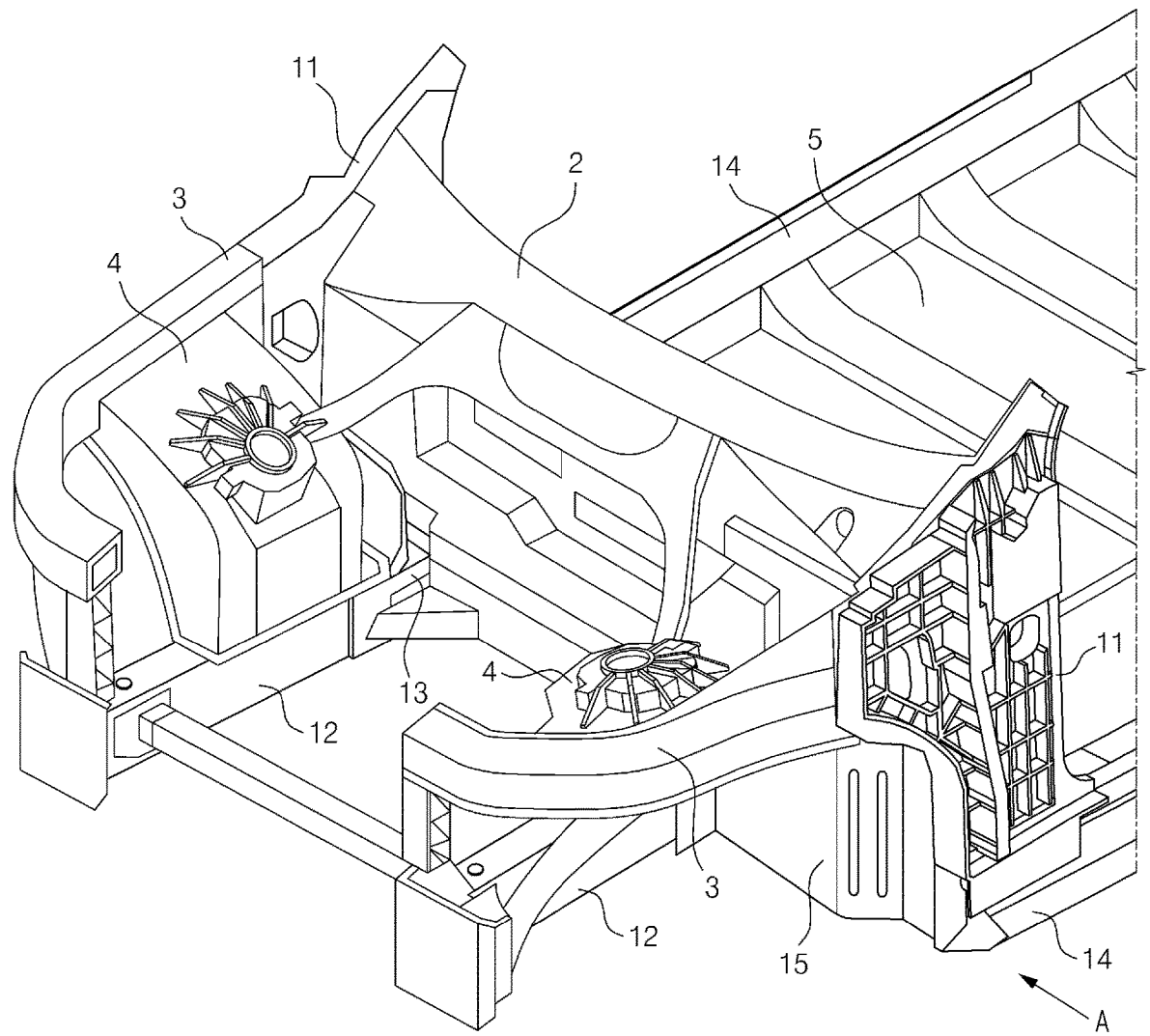
FIG. 1 illustrates a perspective view of a vehicle body structure according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
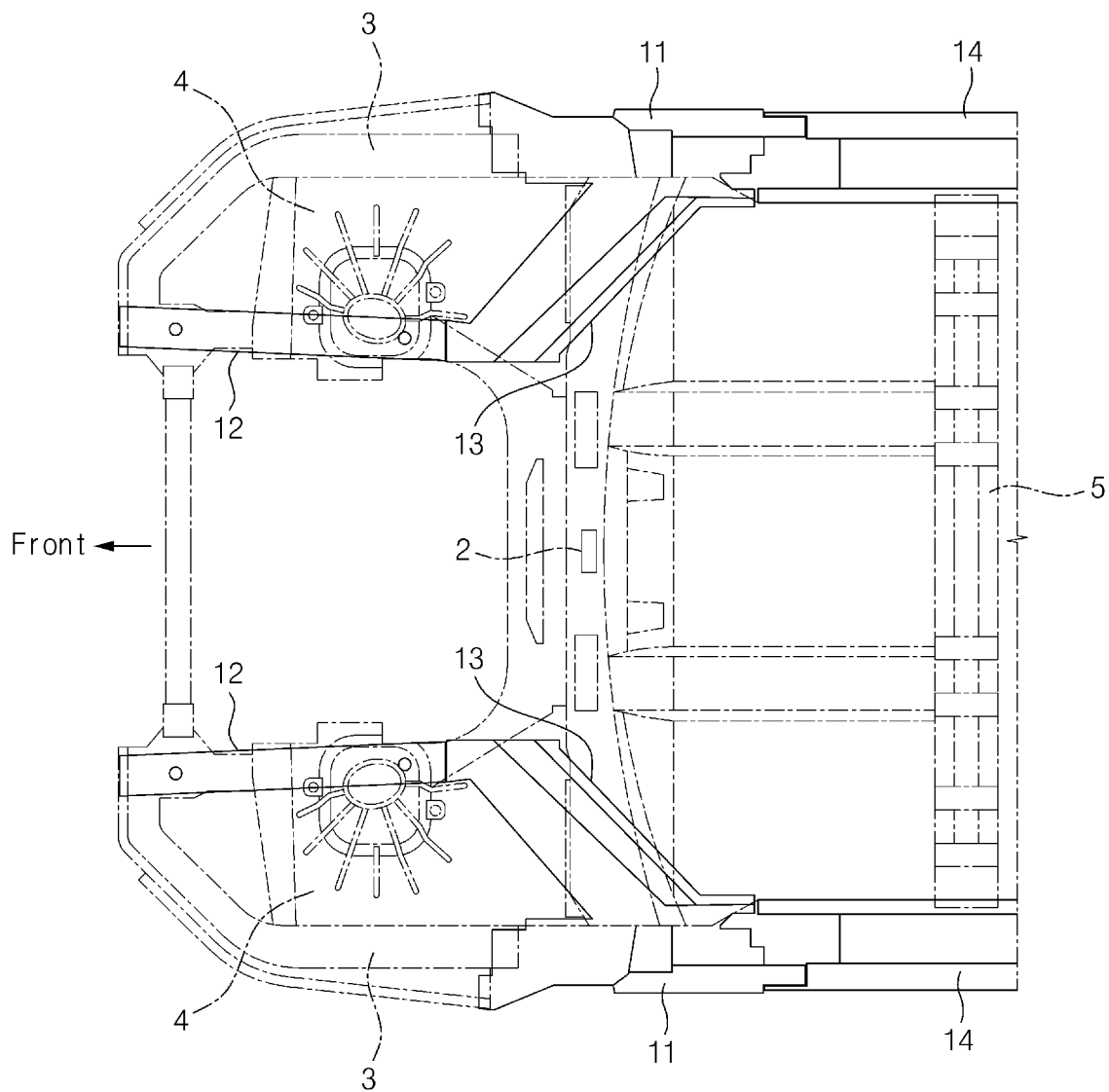
FIG. 2 illustrates a plan view of a vehicle body structure according to an exemplary embodiment of the present disclosure.

Referring to FIGS. 1 and 2, a vehicle body structure according to an exemplary embodiment of the present disclosure may include a floor 5, a dash panel 2 connected to a front end of the floor 5, a pair of front pillars 11 joined to both side edges of the dash panel 2, a pair of front side members 12 extending from the dash panel 2 toward the front of the vehicle, and a pair of side sills 14 disposed on both side edges of the floor 5.

The dash panel 2 may separate a front compartment and a passenger compartment, and the front compartment may contain a power train including an electric motor or an internal combustion engine.

Figure 3:
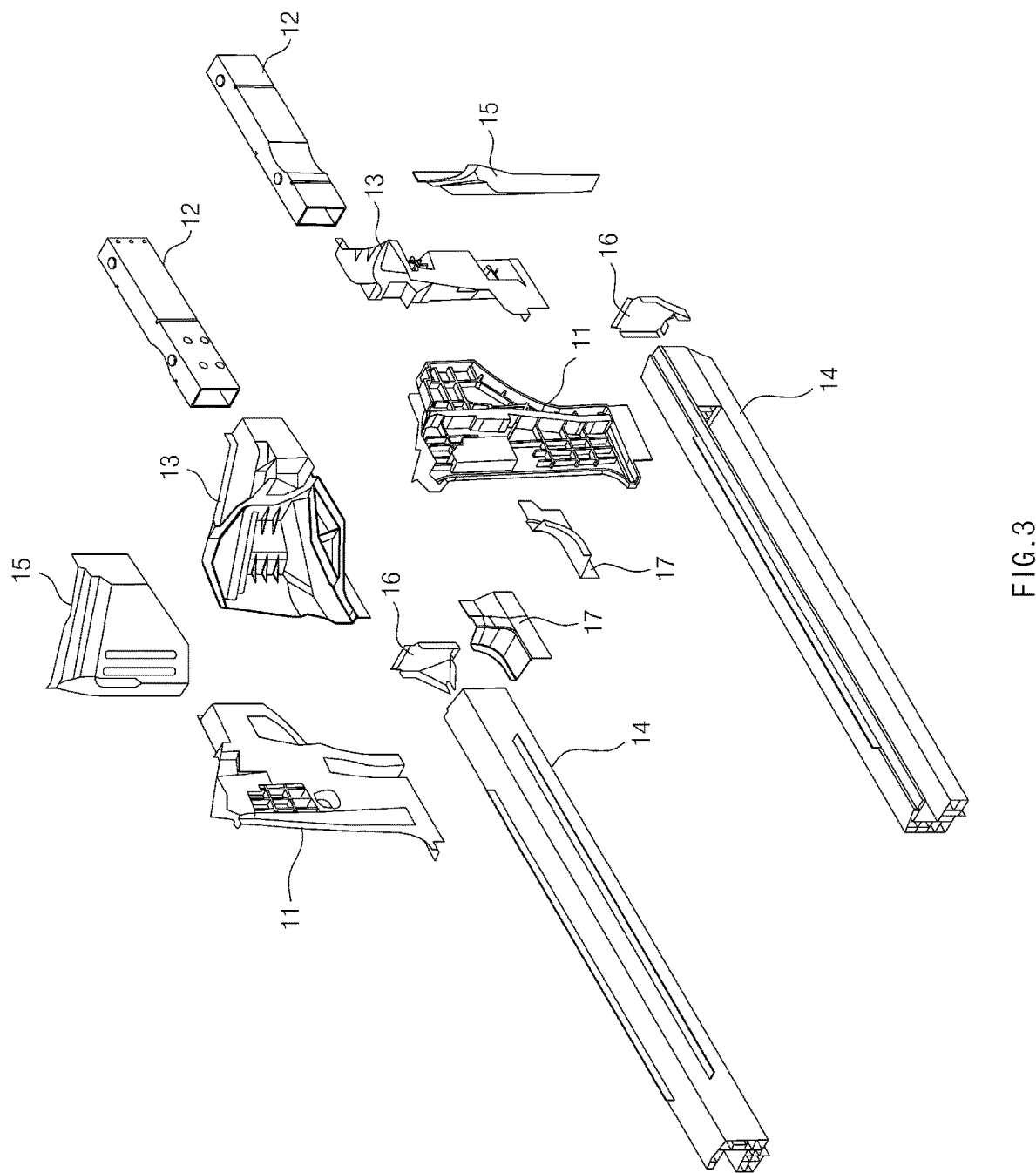
FIG. 3 illustrates an exploded perspective view of some components of a vehicle body structure according to an exemplary embodiment of the present disclosure.
Figure 4:
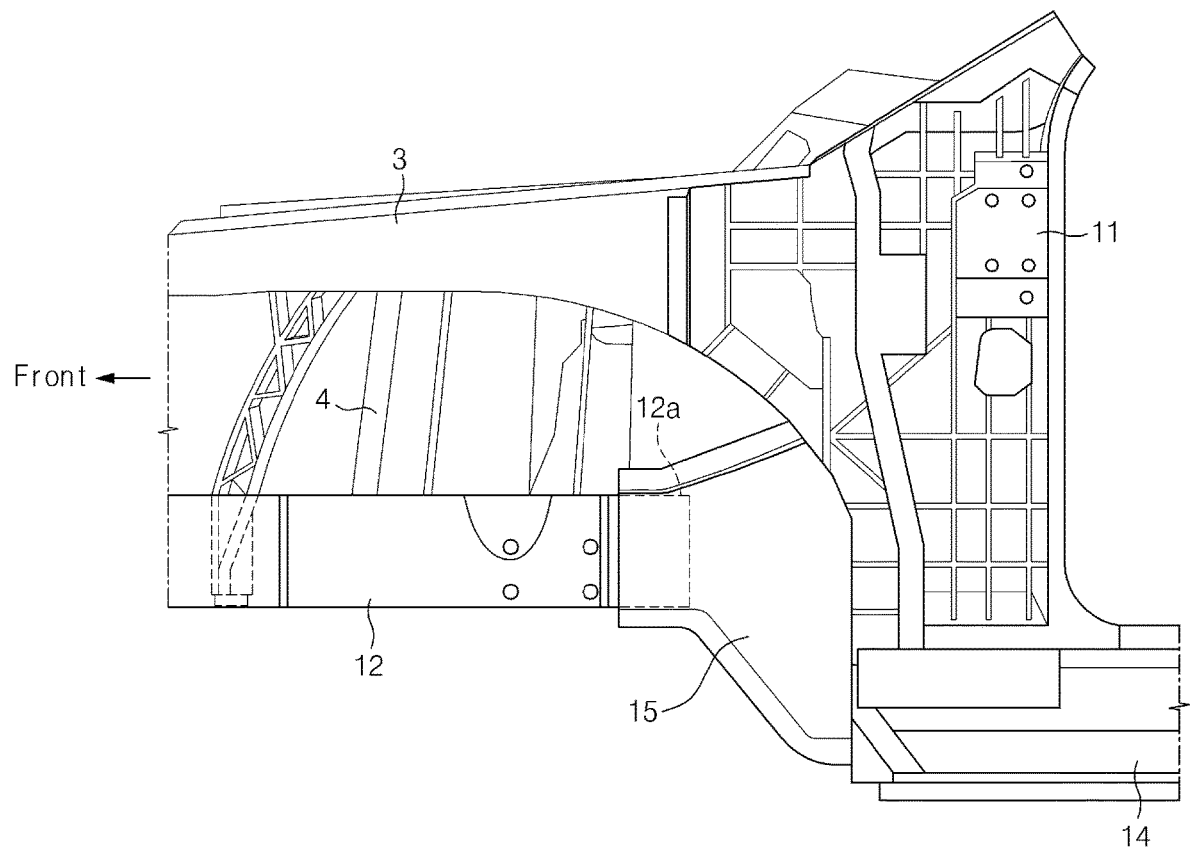
FIG. 4 illustrates a view which is viewed from a direction indicated by arrow A of FIG. 1.
Figure 5:
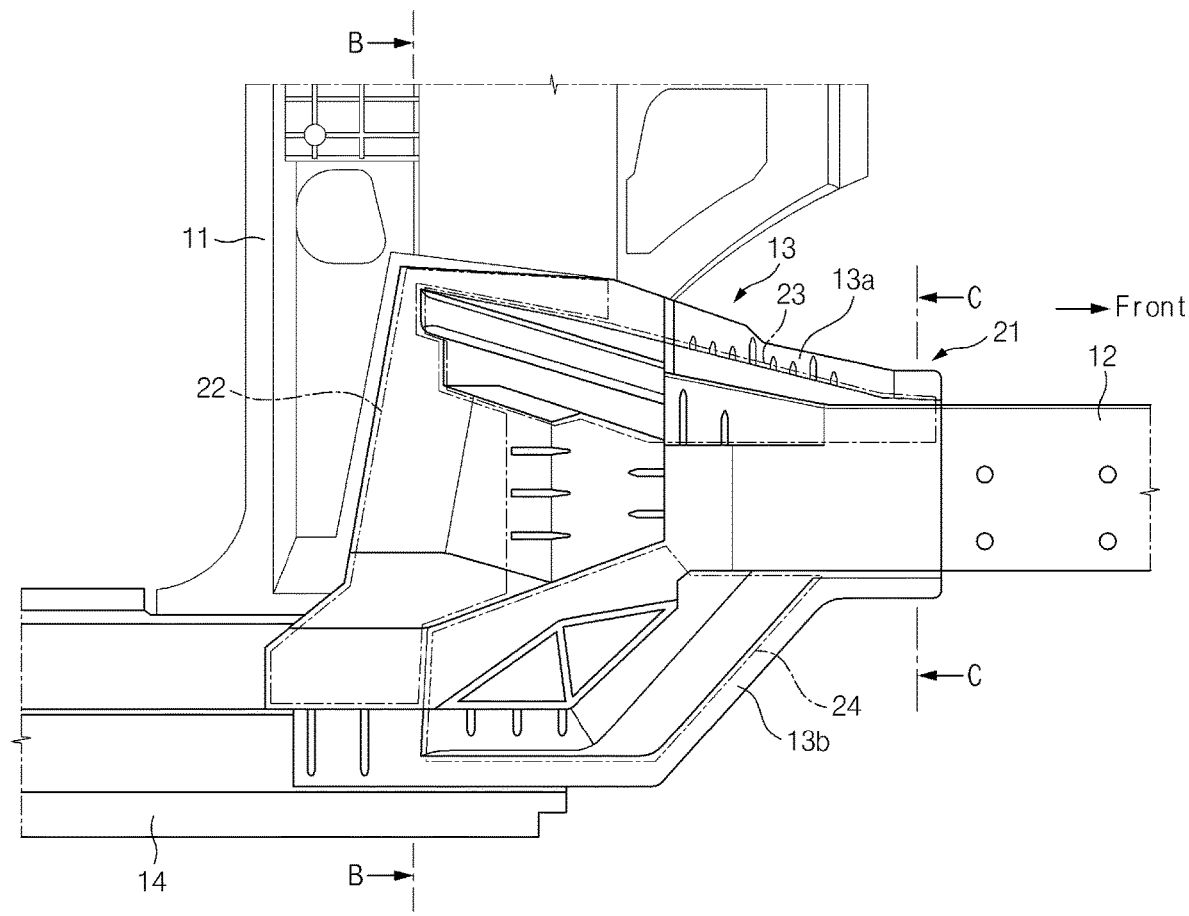
FIG. 5 illustrates a left side view of a vehicle body structure according to an exemplary embodiment of the present disclosure, which is viewed from the interior of the vehicle.

The pair of front side members 12 may be spaced apart from each other in a width direction of the vehicle, and each front side member 12 may extend in a longitudinal direction of the vehicle. Each front side member 12 may have a front portion and a rear portion. A bumper (not shown) may be connected between the front portions of the pair of front side members 12. The rear portion of the front side member 12 may be connected to a front portion of the side sill 14 through a rear lower member 13. Referring to FIG. 3, each front side member 12 may have a top wall facing the top of the vehicle, a bottom wall facing the bottom of the vehicle, an inboard sidewall facing the interior of the vehicle, and an outboard sidewall facing the exterior of the vehicle. Referring to FIGS. 4 and 5, the rear portion 12a of the front side member 12 may be joined to the rear lower member 13 and an outer reinforcement 15 by a joint (e.g., fasteners, welding, etc.).

The pair of front pillars 11 may be joined to both side edges of the dash panel 2, respectively, and each front pillar 11 may be connected to the rear lower member 13 and the front portion of the side sill 14. The front pillar 11 may be a front pillar inner facing the interior of the vehicle in a side structure of the vehicle body. A fender side member 3 may be connected to a front portion of the front pillar 11, and a damper housing 4 may be connected to the fender side member 3.

The front pillar 11 may have an inboard side surface facing the interior of the vehicle and an outboard side surface facing the exterior of the vehicle. The front pillar 11 may be manufactured by press forming, casting, or the like. According to an exemplary embodiment, the front pillar 11 may be manufactured by pressing a steel plate. According to another exemplary embodiment, the front pillar 11 may be manufactured by pressing an aluminum plate. According to another exemplary embodiment, the front pillar 11 may be manufactured by high-vacuum die casting using aluminum. According to another exemplary embodiment, the front pillar 11 may be manufactured by low-pressure casting using aluminum.

The pair of side sills 14 may be joined to both side edges of the floor 5, respectively, and each side sill 14 may extend in the longitudinal direction of the vehicle. According to an exemplary embodiment, each side sill 14 may be any one of an aluminum extruded component, an aluminum die-cast component, a combination of a pressed steel component and a pressed steel reinforcement, a combination of a pressed steel component and an aluminum extruded reinforcement, or an aluminum low-pressure cast component.

Referring to FIGS. 2 and 3, the pair of rear lower members 13 may be symmetrically disposed on both sides of the dash panel 2, and each rear lower member 13 may connect the front side member 12, the side sill 14, and the front pillar 11.

Referring to FIG. 3, the front pillar 11, the front side member 12, the rear lower member 13, and the side sill 14 may be structurally connected to form a basic form of the vehicle body structure. Hereinbelow, the front pillar 11, the front side member 12, the rear lower member 13, and the side sill 14 may also be referred to as "structural members or frame members". The vehicle body structure according to an exemplary embodiment of the present disclosure may further include a plurality of connection members 15, 16, and 17 by which the structural members are connected to each other. According to an exemplary embodiment of the present disclosure, the plurality of connection members 15, 16, and 17 may include the outer reinforcement 15 joined to the outboard side of the rear lower member 13, a side sill reinforcement 16 joined to a front end of the side sill 14, and a pillar reinforcement 17 joined to a lower portion of the front pillar 11.

Referring to FIG. 5, each rear lower member 13 may connect the rear portion of the front side member 12 to the front portion of the corresponding side sill 14 and the lower portion of the corresponding front pillar 11.

According to an exemplary embodiment, the rear lower member 13 may be any one of an aluminum die-cast component or an aluminum low-pressure cast component.

Figure 6:
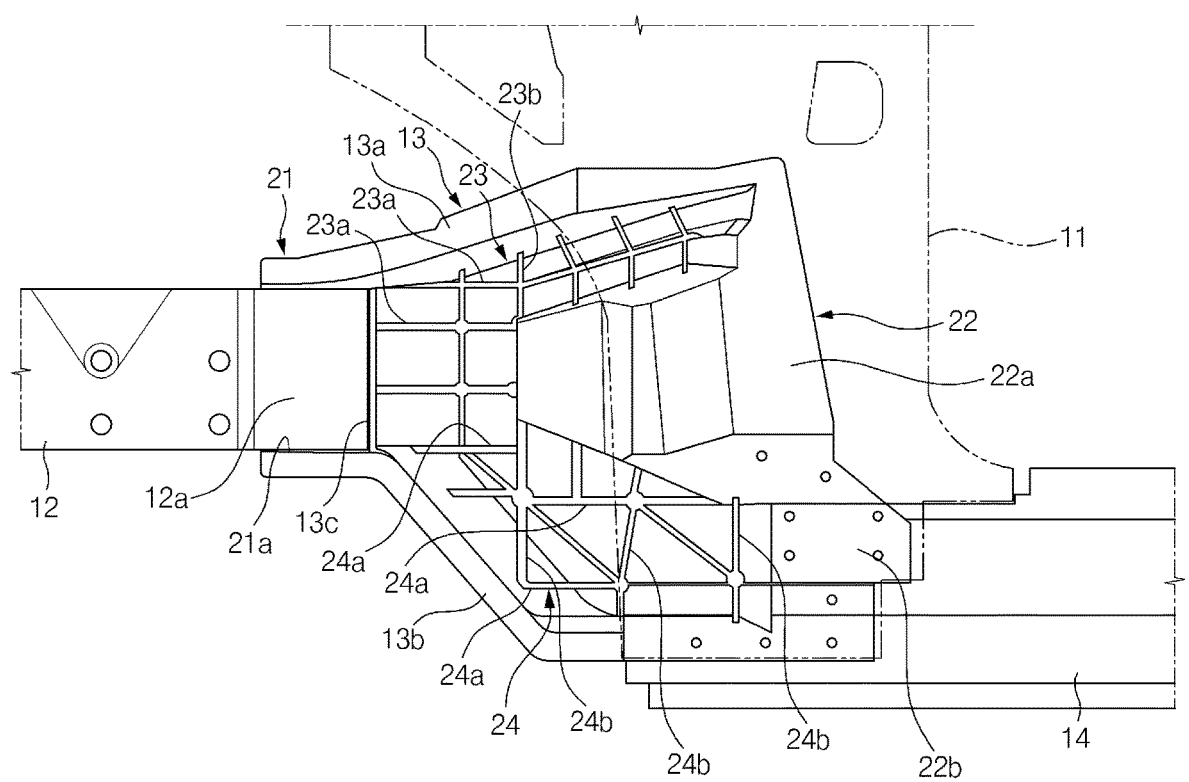
FIG. 6 illustrates the connection of a front side member, a rear lower member, and a side sill in a vehicle body structure according to an exemplary embodiment of the present disclosure.
Figure 7:
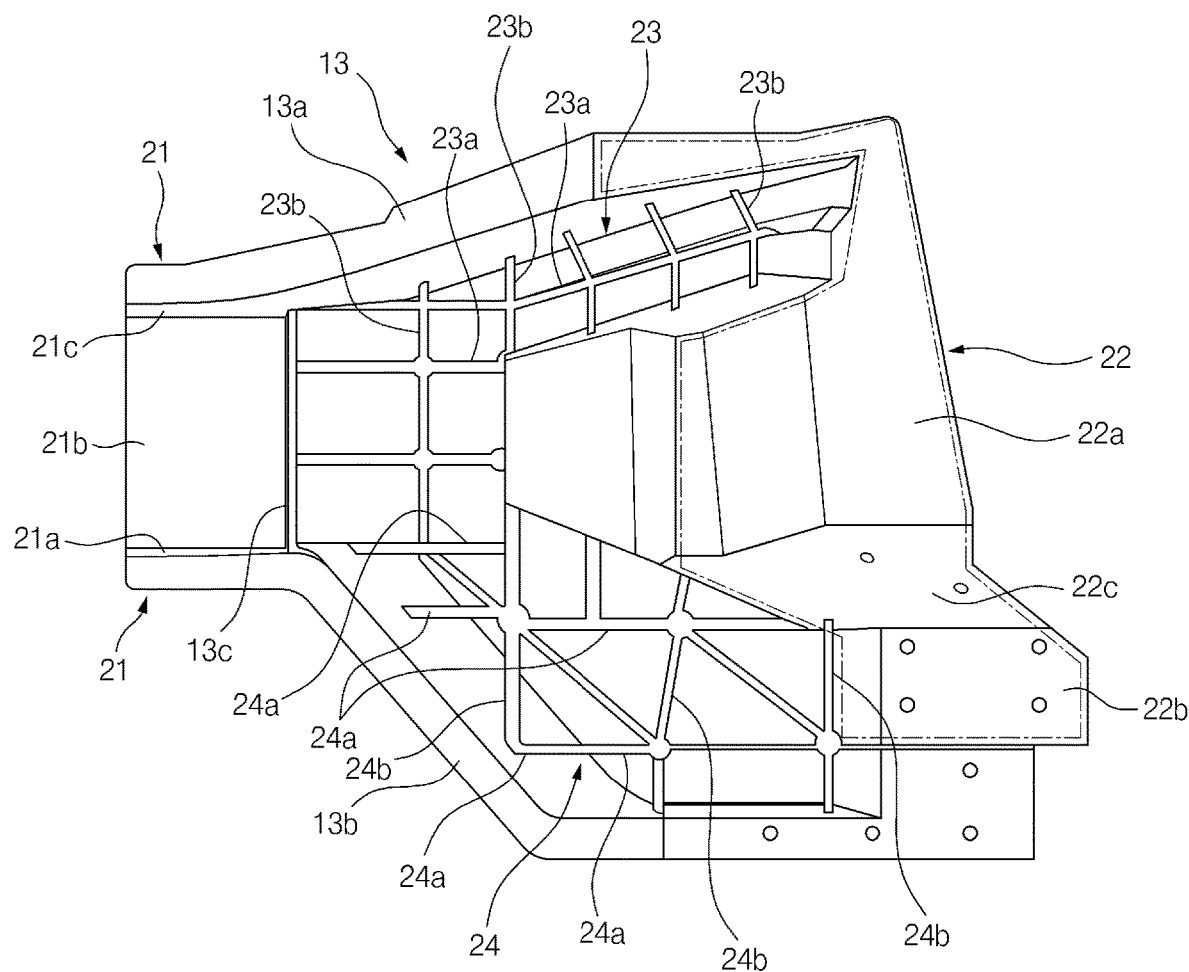
FIG. 7 illustrates a side view of a rear lower member of a vehicle body structure according to an exemplary embodiment of the present disclosure.
Figure 8:
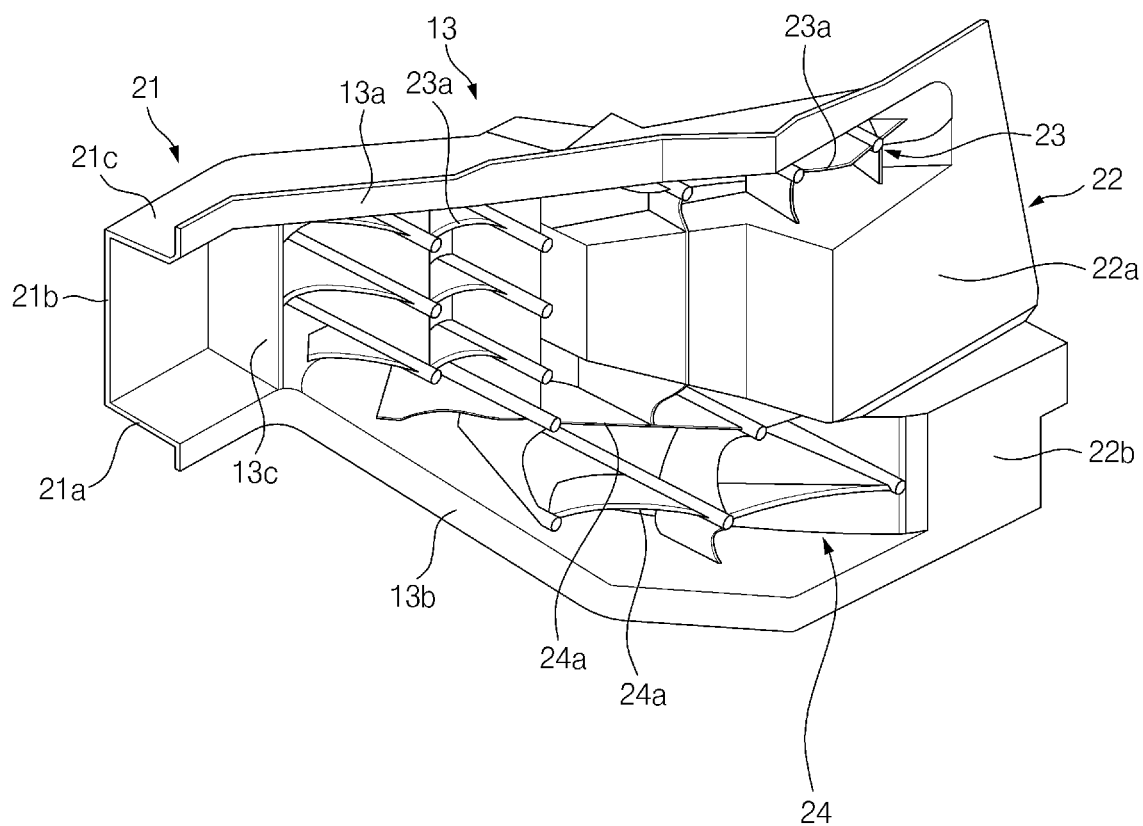
FIG. 8 illustrates a perspective view of a rear lower member of a vehicle body structure according to an exemplary embodiment of the present disclosure.

Referring to FIGS. 6 to 8, each rear lower member 13 may include a top flange 13a extending toward the top of the vehicle, a bottom flange 13b extending toward the bottom of the vehicle, and a support wall 13c facing the front of the vehicle. The top flange 13a may extend along a top edge of the rear lower member 13, and the bottom flange 13b may extend along a bottom edge of the rear lower member 13. The support wall 13c may have a flat surface perpendicular to a longitudinal axis of the front side member 12, and the rear portion 12a of the front side member 12 may be supported by the support wall 13c.

Figure 17:
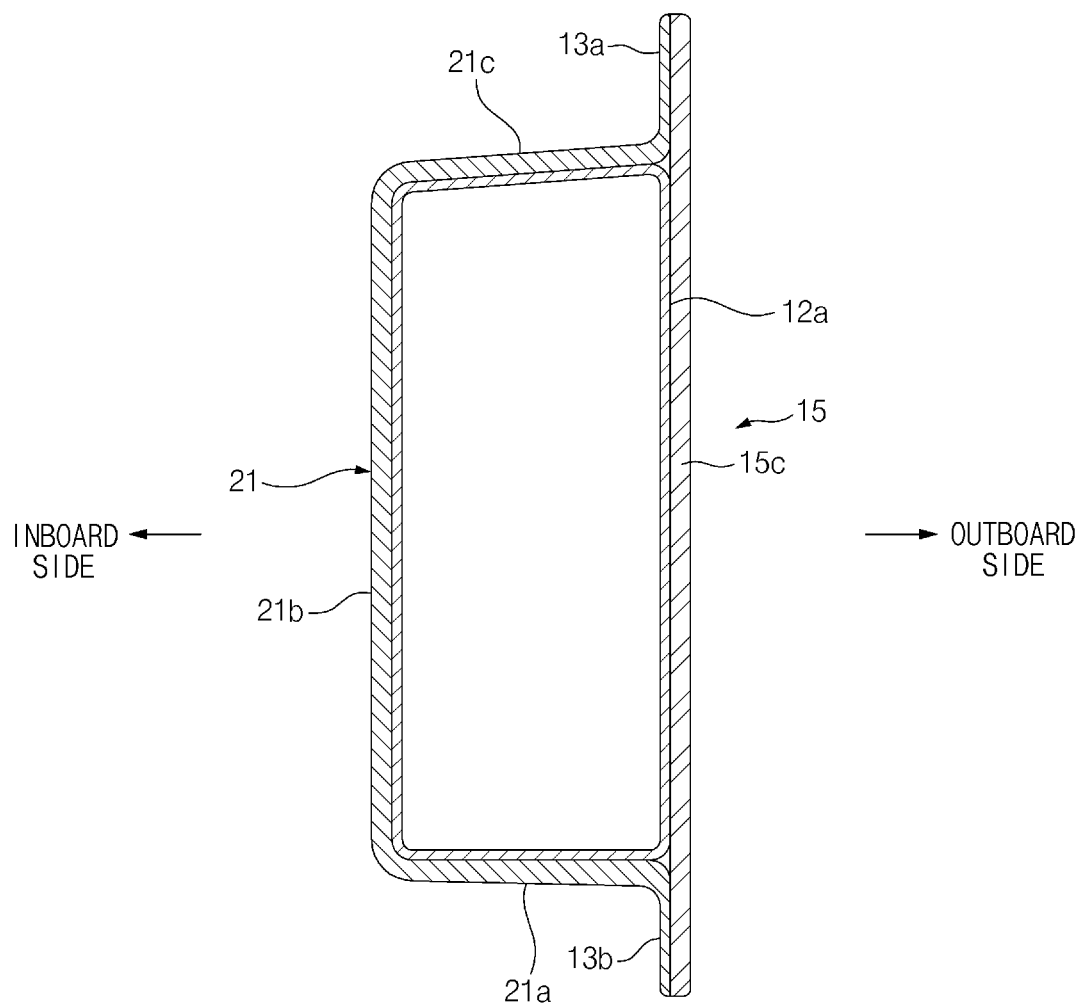
FIG. 17 illustrates a cross-sectional view, taken along line C-C of FIG. 5.

Referring to FIGS. 3 and 17, the outer reinforcement 15 may be joined to the rear lower member 13. In particular, the outer reinforcement 15 may be joined to the top flange 13a and the bottom flange 13b of the rear lower member 13 by a joint (fasteners, welding, etc.).

Referring to FIGS. 6 to 8, each rear lower member 13 may include a front connection portion 21 connected to the rear portion of the front side member 12, and a rear connection portion 22 connected to the lower portion of the front pillar 11 and the front portion of the side sill 14.

According to an exemplary embodiment, the front connection portion 21 may at least partially surround the rear portion 12a of the front side member 12. In particular, the front connection portion 21 may have two or more walls matching at least two walls of the rear portion 12a of the front side member 12.

Referring to FIG. 17, the front connection portion 21 may include a bottom wall 21a facing the bottom of the vehicle, an inboard sidewall 21b facing the interior of the vehicle, and a top wall 21c facing the top of the vehicle. Specifically, the bottom wall 21a of the front connection portion 21 may be connected to the bottom wall of the rear portion 12a of the front side member 12, the inboard sidewall 21b of the front connection portion 21 may be connected to the inboard sidewall of the rear portion 12a of the front side member 12, and the top wall 21c of the front connection portion 21 may be connected to the top wall of the rear portion 12a of the front side member 12. That is, the bottom wall 21a, the inboard sidewall 21b, and the top wall 21c of the front connection portion 21 may match the bottom wall, the inboard sidewall, and the top wall of the rear portion 12a of the front side member 12, respectively. The front connection portion 21 may have a C-shaped cross section surrounding the top wall, the inboard sidewall, and the bottom wall of the rear portion 12a of the front side member 12. In addition, the outer reinforcement 15 may be connected to the outboard sidewall of the rear portion 12a of the front side member 12.

Figure 18:
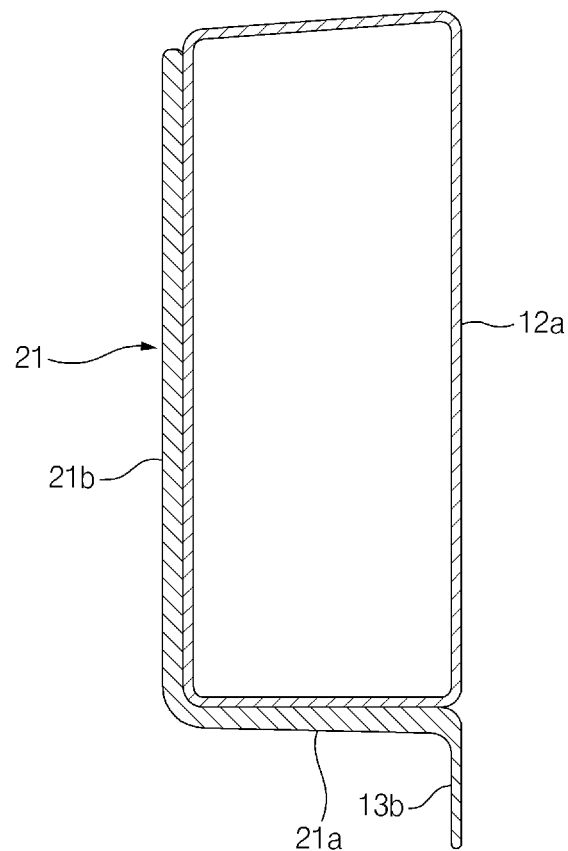
FIG. 18 illustrates a cross-sectional view of a modification of the embodiment illustrated in FIG. 17.

Referring to FIG. 18, the front connection portion 21 may include the bottom wall 21a facing the bottom of the vehicle, and the inboard sidewall 21b facing the interior of the vehicle. Specifically, the bottom wall 21a of the front connection portion 21 may be connected to the bottom wall of the rear portion 12a of the front side member 12, and the inboard sidewall 21b of the front connection portion 21 may be connected to the inboard sidewall of the rear portion 12a of the front side member 12. That is, the bottom wall 21a and the inboard sidewall 21b of the front connection portion 21 may match the bottom wall and the inboard sidewall of the rear portion 12a of the front side member 12, respectively. The front connection portion 21 may have an L-shaped cross section surrounding the bottom wall and the inboard sidewall of the rear portion 12a of the front side member 12.

Figure 19:
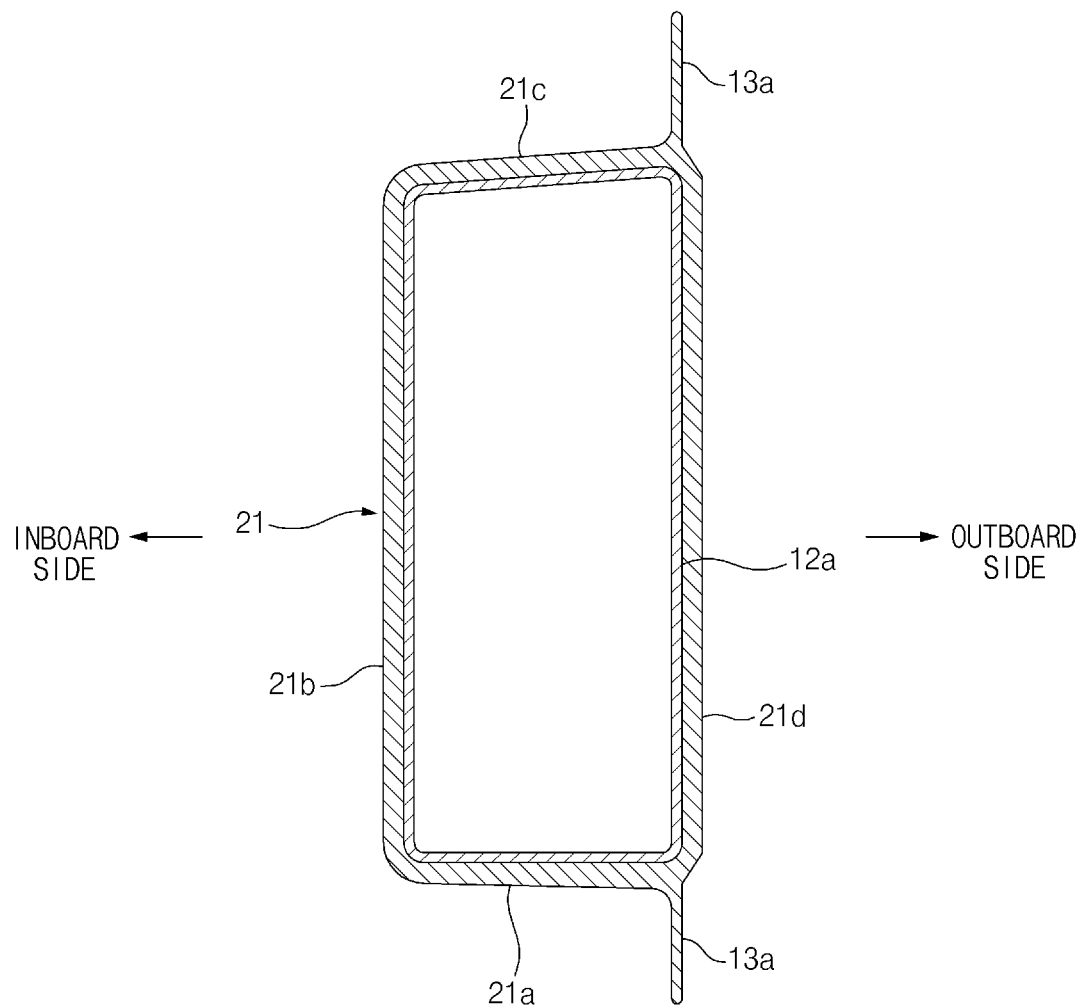
FIG. 19 illustrates a cross-sectional view of a modification of the embodiment illustrated in FIG. 17.

Referring to FIG. 19, the front connection portion 21 may include the bottom wall 21a facing the bottom of the vehicle, the inboard sidewall 21b facing the interior of the vehicle, the top wall 21c facing the top of the vehicle, and an outboard sidewall 21d facing the exterior of the vehicle. Specifically, the bottom wall 21a of the front connection portion 21 may be connected to the bottom wall of the rear portion 12a of the front side member 12, the inboard sidewall 21b of the front connection portion 21 may be connected to the inboard sidewall of the rear portion 12a of the front side member 12, the top wall 21c of the front connection portion 21 may be connected to the top wall of the rear portion 12a of the front side member 12 and the outboard sidewall 21d of the front connection portion 21 may be connected to the outboard sidewall of the rear portion 12a of the front side member 12. That is, the bottom wall 21a, the inboard sidewall 21b, the top wall 21c, and the outboard sidewall 21d of the front connection portion 21 may match the bottom wall, the inboard sidewall, the top wall, and the outboard sidewall of the rear portion 12a of the front side member 12, respectively. The front connection portion 21 may have a closed cross section surrounding the top wall, the inboard sidewall, the bottom wall, and the outboard sidewall of the rear portion 12a of the front side member 12.

Figure 20:
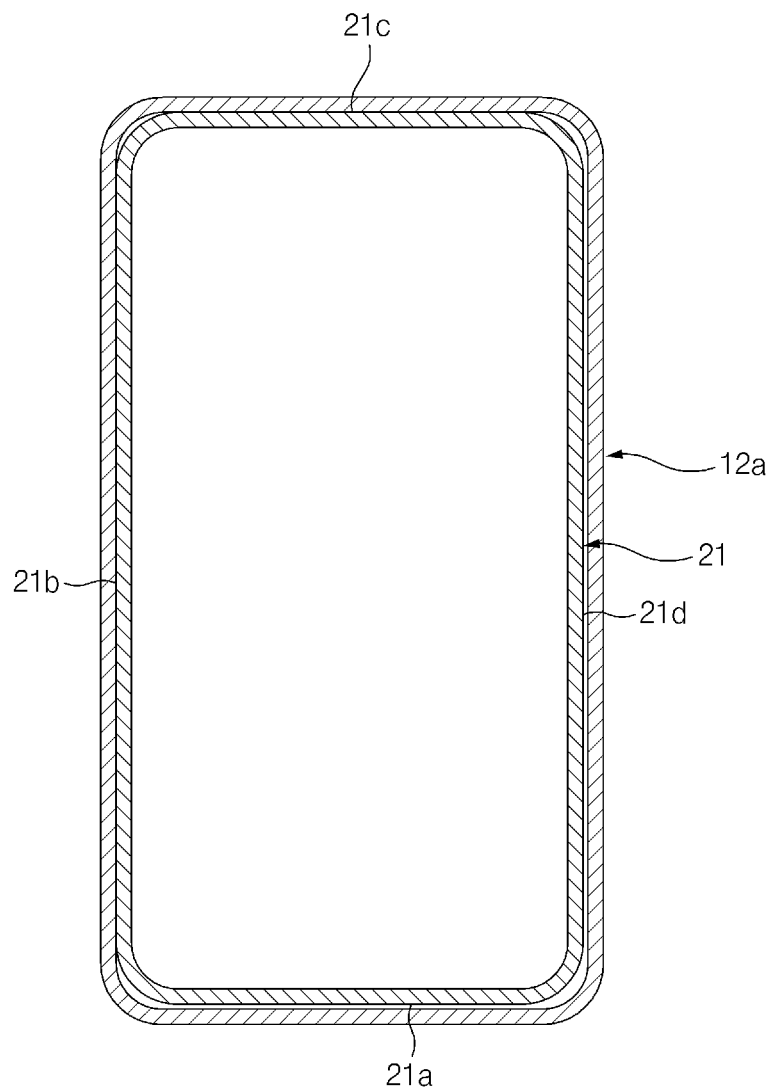
FIG. 20 illustrates a cross-sectional view of a modification of the embodiment illustrated in FIG. 17.

According to another exemplary embodiment, the rear portion 12a of the front side member 12 may surround the front connection portion 21. Referring to FIG. 20, the rear portion 12a of the front side member 12 may surround the bottom wall 21a, the inboard sidewall 21b, the top wall 21c, and the outboard sidewall 21d of the front connection portion 21.

Referring to FIG. 6, the rear connection portion 22 may include an upper engagement wall 22a joined to the lower portion of the front pillar 11, and a lower engagement wall 22b joined to the front portion of the side sill 14. Referring to FIGS. 7 and 8, the upper engagement wall 22a and the lower engagement wall 22b may be connected through a connection wall 22c in a height direction of the vehicle. The upper engagement wall 22a and the lower engagement wall 22b may have a flat surface.

Figure 9:
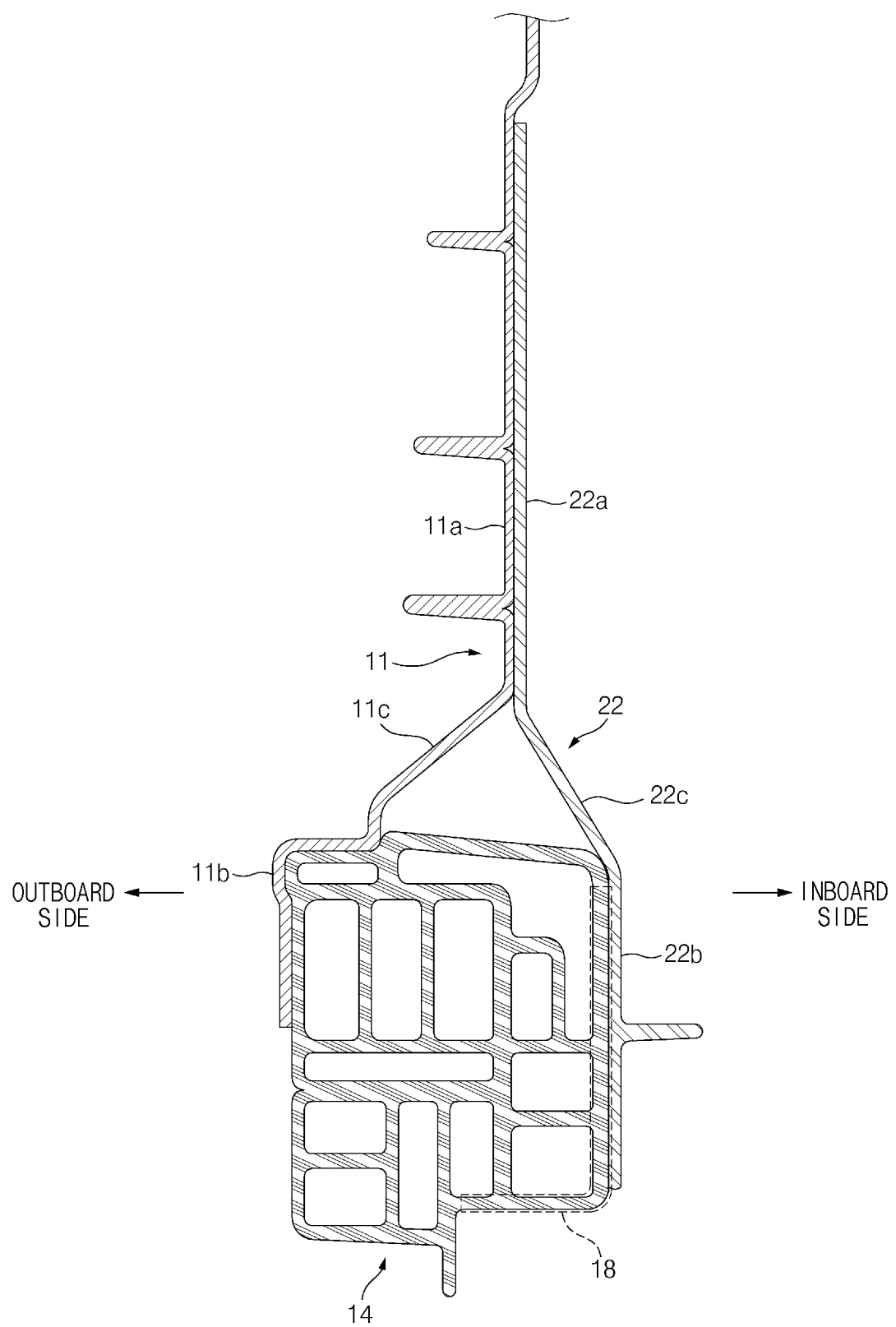
FIG. 9 illustrates a cross-sectional view, taken along line B-B of FIG. 5.
Figure 10:
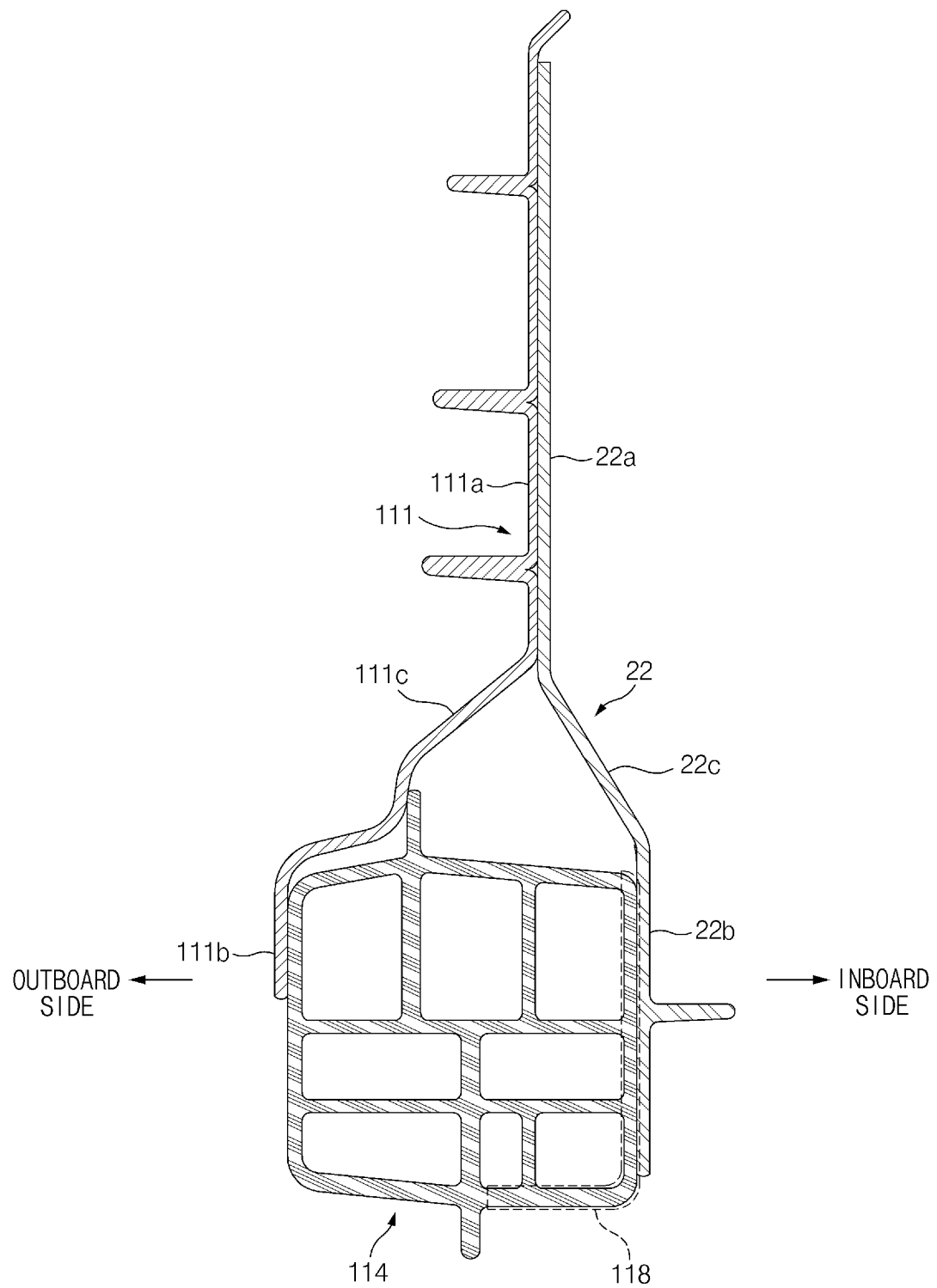
FIG. 10 illustrates a cross-sectional view of a modification of the embodiment illustrated in FIG. 9.

Referring to FIGS. 9 and 10, the upper engagement wall 22a may have a flat surface parallel to the inboard side surface of the front pillar 11, and the upper engagement wall 22a may be joined to the inboard side surface of the front pillar 11 by a joint (fasteners, welding, etc.). The lower engagement wall 22b may have a flat surface parallel to an inboard sidewall of the side sill 14, and the lower engagement wall 22b may be joined to the inboard sidewall of the side sill 14 by a joint (fasteners, welding, etc.).

As described above, the front connection portion 21 of the rear lower member 13 may be connected to the front side member 12, and the rear connection portion 22 of the rear lower member 13 may be connected to the front pillar 11 and the side sill 14 so that the rear lower member 13 may firmly connect the front side member 12, the front pillar 11, and the side sill 14, thereby improving stiffness of the vehicle body and reliably defining load paths.

According to an exemplary embodiment, the upper engagement wall 22a and the lower engagement wall 22b may have the same shape and the same dimension between difference models of vehicles. As illustrated in FIGS. 9 and 10, the rear lower member 13 may be joined to a front pillar 11 or 111 and a side sill 14 or 114 for different models of vehicle in the same assembly position using the same assembly method. For example, FIG. 9 illustrates the rear lower member 13 connecting the front pillar 11 and the side sill 14 of a first vehicle, in which the upper engagement wall 22*a* of the rear lower member 13 may be joined to the front pillar 11 of the first vehicle, and the lower engagement wall 22*b* of the rear lower member 13 may be joined to the inboard sidewall of the side sill 14 of the first vehicle. FIG. 10 illustrates the rear lower member 13 connecting the front pillar 111 and the side sill 114 of a second vehicle, in which the upper engagement wall 22*a* of the rear lower member 13 may be joined to the front pillar 111 of the second vehicle, and the lower engagement wall 22*b* of the rear lower member 13 may be joined to the inboard sidewall of the side sill 114 of the second vehicle. As illustrated in FIGS. 9 and 10, the rear lower member 13 may be designed to connect the front pillars 11 and 111 and the side sills 14 and 114 of different models of vehicles in the same assembly position using the same assembly method, thereby flexibly responding to the production of various models of vehicles. Meanwhile, according to the exemplary embodiments illustrated in FIGS. 9 and 10, the upper engagement wall 22*a* and the lower engagement wall 22*b* may be connected by the inclined connection wall 22*c*, and the inclined connection wall 22*c* may not be joined to the front pillars 11 and 111 and the side sills 14 and 114.

Referring to FIGS. 5 to 8, the rear lower member 13 may include an upper connection portion 23 connecting the front side member 12 and the front pillar 11, and a lower connection portion 24 connecting the front side member 12 and the side sill 14.

The upper connection portion 23 may extend obliquely from the rear portion 12*a* of the front side member 12 toward the lower portion of the front pillar 11 so that the upper connection portion 23 may connect the rear portion 12*a* of the front side member 12 and the lower portion of the front pillar 11. Specifically, the upper connection portion 23 may include a plurality of upper ribs 23*a* extending between the rear portion 12*a* of the front side member 12 and the lower portion of the front pillar 11 in the longitudinal direction of the vehicle. The upper connection portion 23 may transfer a load between the rear portion 12*a* of the front side member 12 and the front pillar 11 through the plurality of upper ribs 23*a*, thereby defining an upper load path on an upper portion of the rear lower member 13.

The lower connection portion 24 may extend straightly from the rear portion 12*a* of the front side member 12 toward the front portion of the side sill 14 so that the lower connection portion 24 may connect the rear portion 12*a* of the front side member 12 and the front portion of the side sill 14. Specifically, the lower connection portion 24 may include a plurality of lower ribs 24*a* extending between the rear portion 12*a* of the front side member 12 and the front portion of the side sill 14 in the longitudinal direction of the vehicle. The lower connection portion 24 may transfer a load between the rear portion 12*a* of the front side member 12 and the front portion of the side sill 14 through the plurality of lower ribs 24*a*, thereby defining a lower load path on a lower portion of the rear lower member 13.

As described above, the rear lower member 13 may connect the front side member 12 and the front pillar 11 through the upper connection portion 23, and connect the front side member 12 and the side sill 14 through the lower connection portion 24 so that connection stiffness of the front side member 12, the front pillar 11, and the side sill 14 may be improved.

Referring to FIGS. 9 to 14, each side sill 14, 114, 214, 314, 414, or 514 may have a top wall facing the top of the vehicle, a bottom wall facing the bottom of the vehicle, an inboard sidewall facing the interior of the vehicle, and an outboard sidewall facing the exterior of the vehicle. Each side sill may define a closed cross section by the top wall, the bottom wall, the inboard sidewall, and the outboard sidewall, and a plurality of ribs may be provided in the inside of the side sill 14, 114, 214, 314, 414, or 514. The side sill 14, 114, 214, 314, 414, or 514 may include a plurality of cavities divided by the plurality of ribs.

Figure 11:
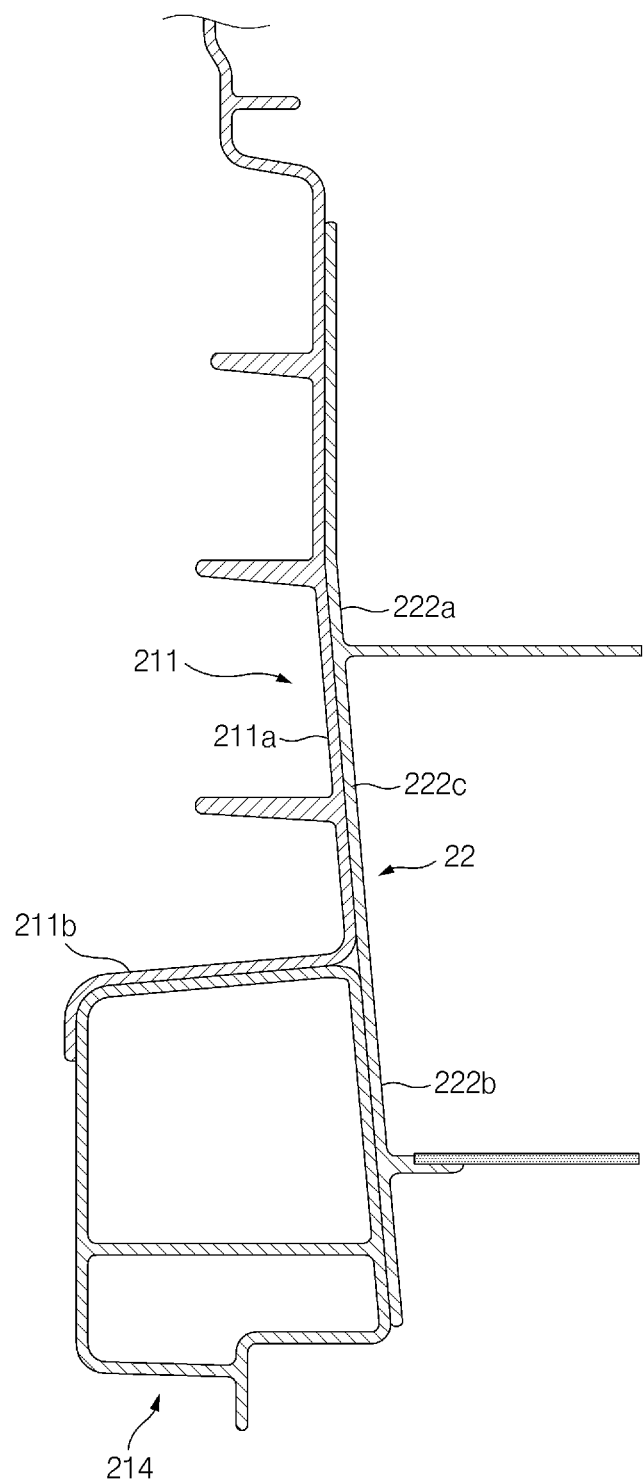
FIG. 11 illustrates a cross-sectional view of a modification of the embodiment illustrated in FIG. 9.
Figure 12:
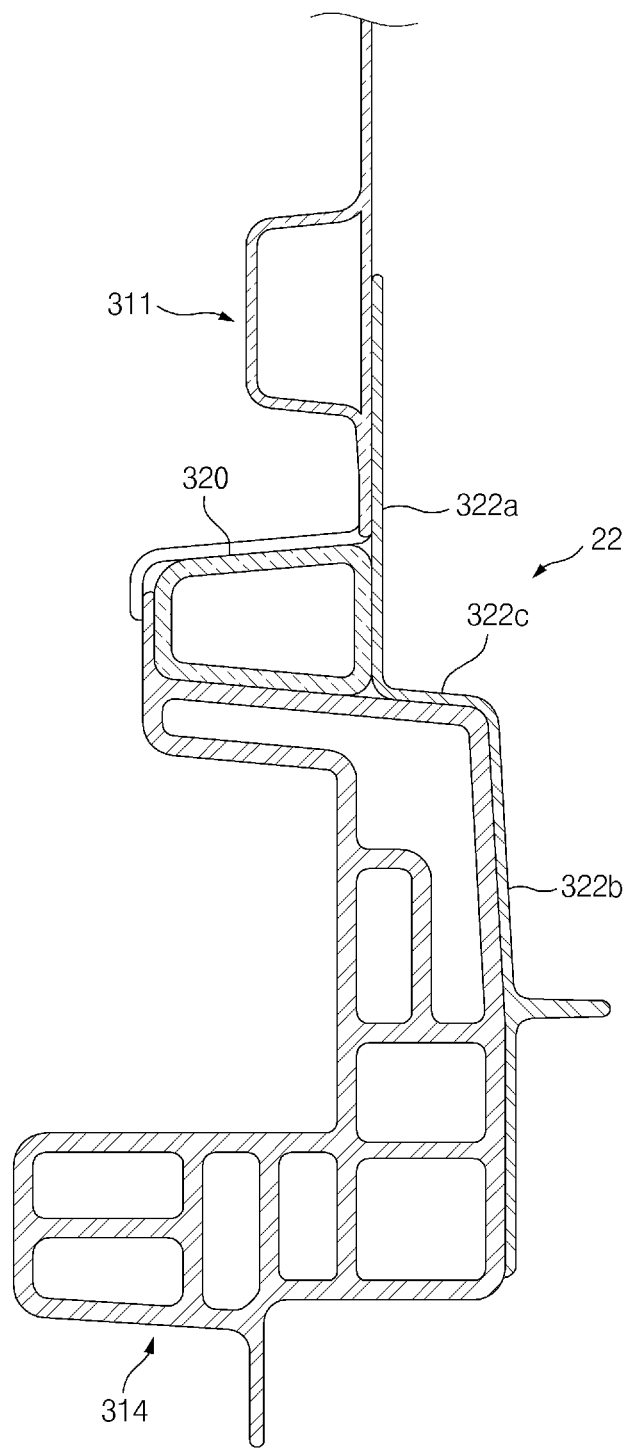
FIG. 12 illustrates a cross-sectional view of a modification of the embodiment illustrated in FIG. 9.
Figure 13:
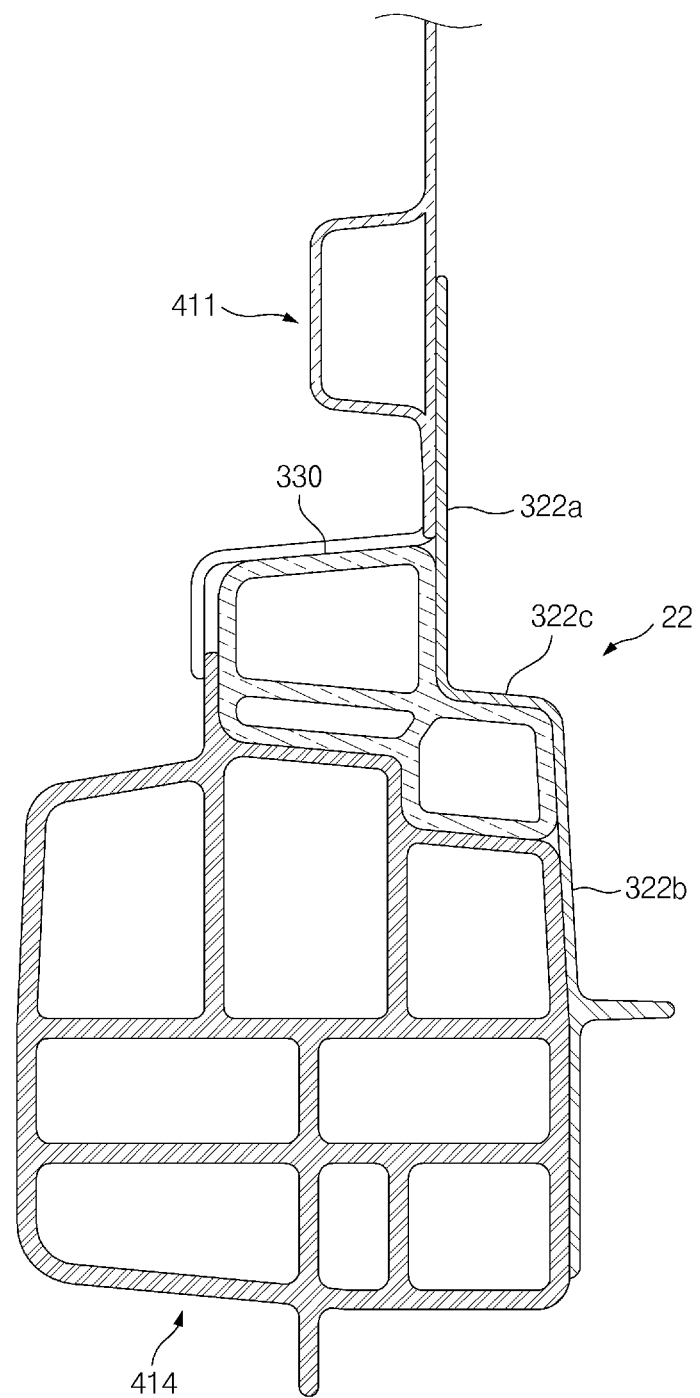
FIG. 13 illustrates a cross-sectional view of a modification of the embodiment illustrated in FIG. 9.
Figure 14:
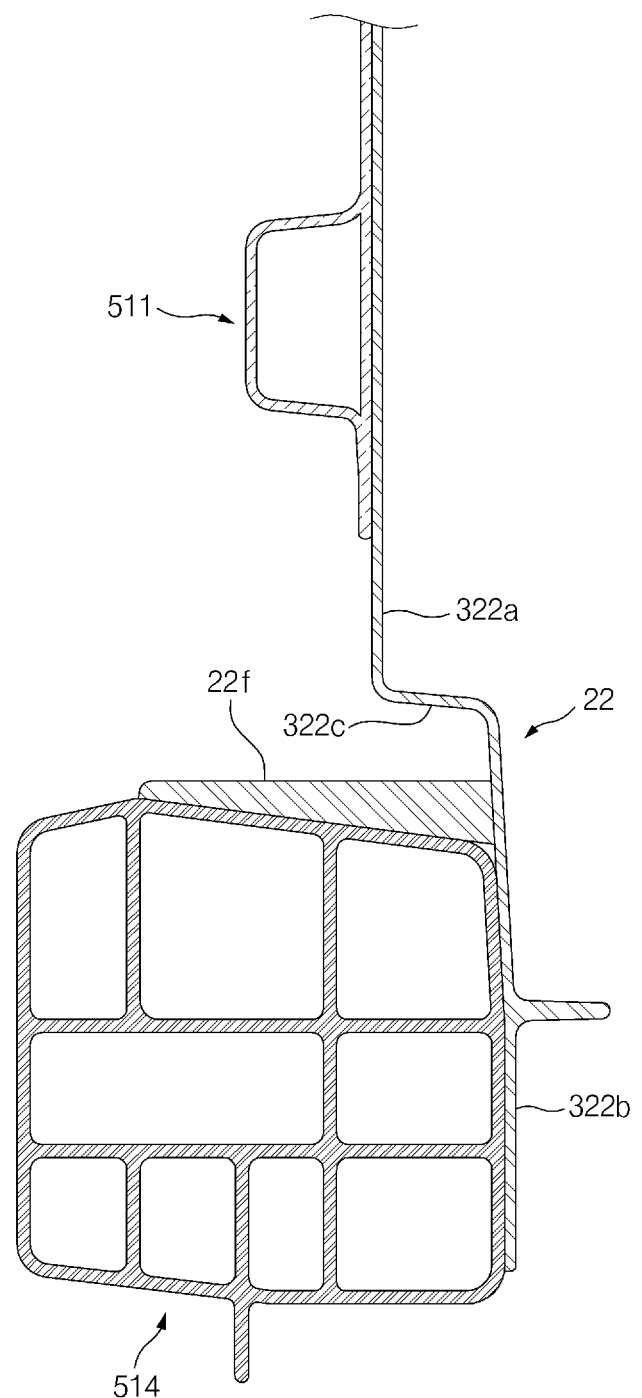
FIG. 14 illustrates a cross-sectional view of a modification of the embodiment illustrated in FIG. 9.

Referring to FIGS. 9 to 14, each side sill 14, 114, 214, 314, 414, or 514 may be manufactured to have different shapes and sizes for different models of vehicles, and each front pillar 11, 111, 211, 311, 411, or 511 may be may be manufactured to have different shapes and sizes for different models of vehicles. For example, FIG. 9 illustrates the front pillar 11 and the side sill 14 and of the first vehicle, FIG. 10 illustrates the front pillar 111 and the side sill 114 of the second vehicle, FIG. 11 illustrates the front pillar 211 and the side sill 214 of a third vehicle, FIG. 12 illustrates the front pillar 311 and the side sill 314 of a fourth vehicle, FIG. 13 illustrates the front pillar 411 and the side sill 414 of a fifth vehicle, and FIG. 14 illustrates the front pillar 511 and the side sill 514 of a sixth vehicle. The first to sixth vehicles may be of different models.

The side sill 14 of the first vehicle illustrated in FIG. 9 may have a common area 18 provided on at least a portion of the inboard sidewall and at least a portion of the bottom wall, and the side sill 114 of the second vehicle illustrated in FIG. 10 may have a common area 118 provided on at least a portion of the inboard sidewall and at least a portion of the bottom wall. The common area 18 of the side sill 14 in FIG. 9 may have the same shape and the same dimension as those of the common area 118 of the side sill 114 in FIG. 10. As the inboard sidewalls and the bottom walls of the side sills 14 and 114 for different models of vehicles have the common areas 18 and 118 having the same shape and the same dimension, the rear lower member 13 may be joined to each of the common areas 18 and 118 of the side sills 14 and 114 in the same assembly position using the same assembly method, thereby flexibly responding to the production of various models of vehicles and reducing the manufacturing cost thereof.

Figure 15:
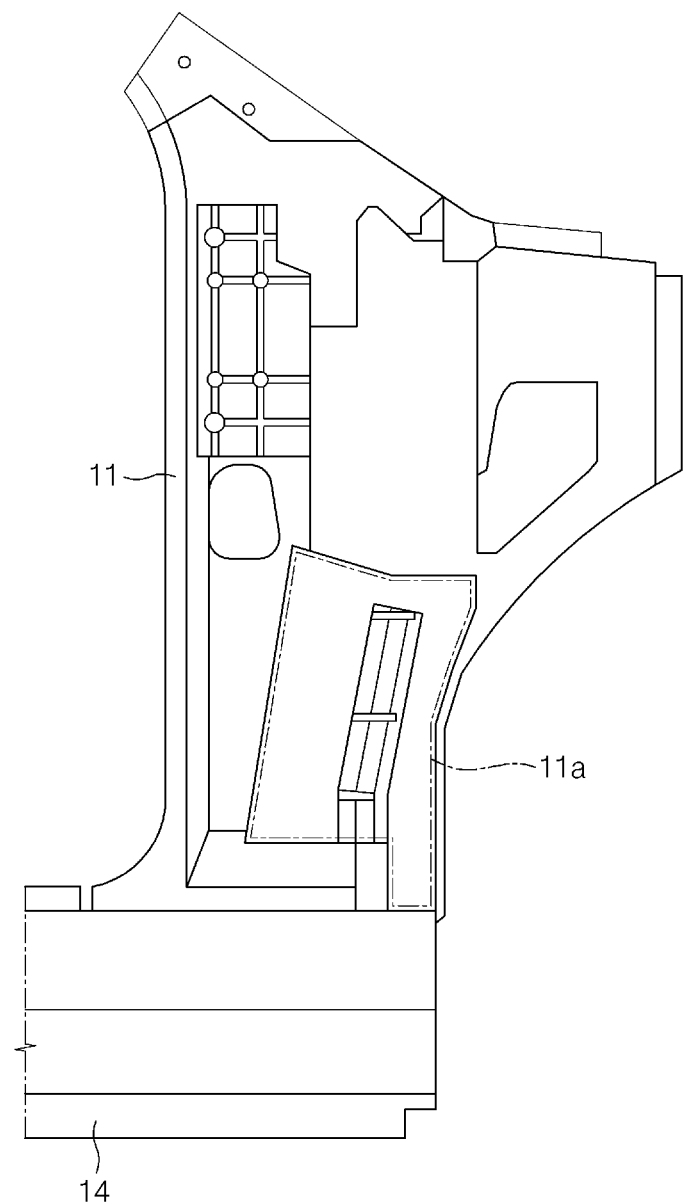
FIG. 15 illustrates the connection of a front pillar and a side sill in a vehicle body structure according to an exemplary embodiment of the present disclosure, which is viewed from the interior of the vehicle.
Figure 16:
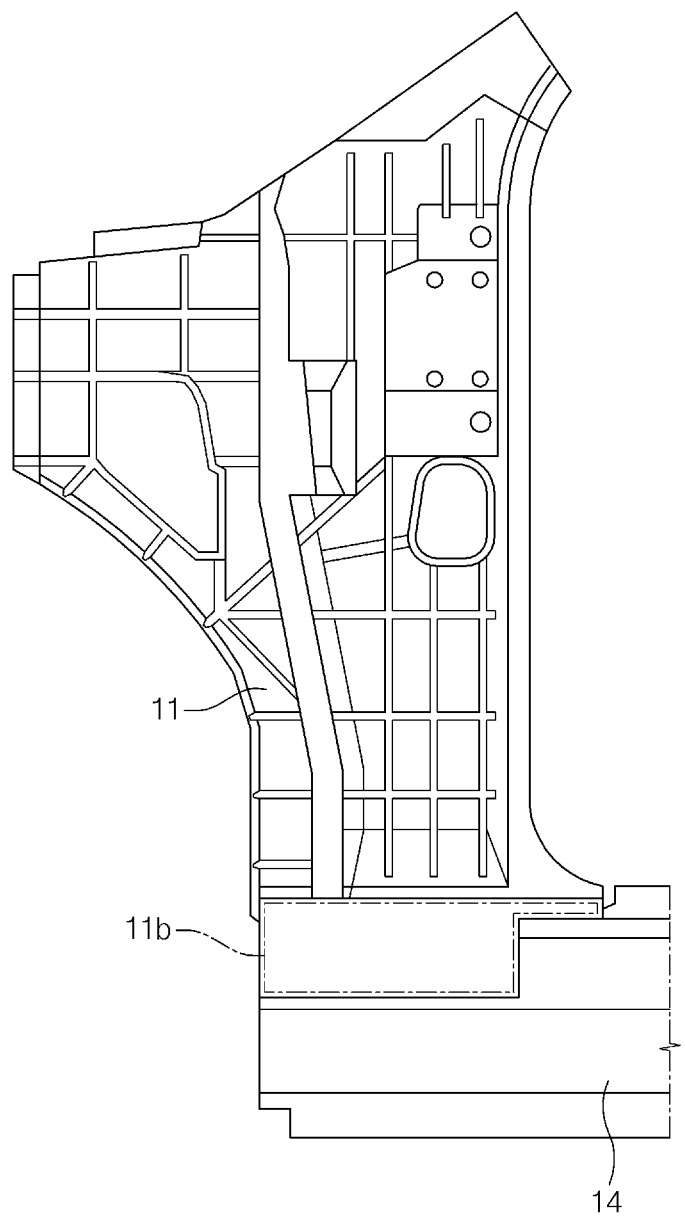
FIG. 16 illustrates the connection of a front pillar and a side sill in a vehicle body structure according to an exemplary embodiment of the present disclosure, which is viewed from the exterior of the vehicle.

Referring to FIGS. 9, 15, and 16, the front pillar 11 may include an upper engagement portion 11*a* joined to the upper engagement wall 22*a* of the rear connection portion 22 of the rear lower member 13, and a lower engagement portion 11*b* joined to the front portion of the side sill 14. The upper engagement portion 11*a* may be connected to the lower engagement portion 11*b* through an inclined connection wall 11*c*.

Referring to FIG. 9, the upper engagement portion 11*a* may have a flat surface parallel to the upper engagement wall 22*a* of the rear connection portion 22 of the rear lower member 13, and the upper engagement portion 11*a* may be joined to the upper engagement wall 22*a* of the rear lower member 13 by a joint (fasteners, welding, etc.). In particular, the lower engagement portion 11*b* may have an L-shaped cross section matching the top wall and the outboard sidewall of the side sill 14, and the lower engagement portion 11*b* may be joined to the top wall and the outboard sidewall of the side sill 14 by a joint (fasteners, welding, etc.). As the lower engagement portion 11*b* of the front pillar 11 has the L-shaped cross section, interference between the front pillar 11 and the side sill 14 may be prevented during the assembly thereof, and the positioning of the front pillar 11 and the side sill 14 may be accurately performed, and thus ease of assembly thereof may be improved.

FIG. 9 illustrates the joining of the upper engagement wall 22*a* of the rear connection portion 22 of the rear lower member 13 and the upper engagement portion 11a of the front pillar 11 of the first vehicle, and FIG. 10 illustrates the joining of the upper engagement wall 22a of the rear connection portion 22 of the rear lower member 13 and an upper engagement portion 111a of the front pillar 111 of the second vehicle. The upper engagement wall 22a of the rear lower member 13 may be joined to each of the upper engagement portions 11a and 111a of the front pillars 11 and 111 for different models of vehicles in the same assembly position using the same assembly method.

FIG. 11 illustrates the rear connection portion 22 of the rear lower member 13 connecting the front pillar 211 and the side sill 214 of the third vehicle. Referring to FIG. 11, the rear connection portion 22 of the rear lower member 13 may include an upper engagement wall 222a, a lower engagement wall 222b, and a connection wall 222c having different shapes and different dimensions to those of the corresponding walls illustrated in FIGS. 9 and 10. The upper engagement wall 222a and the connection wall 222c may be parallel to an upper engagement portion 211a of the front pillar 211 of the third vehicle, and the upper engagement wall 222a and the connection wall 222c may be joined to the upper engagement portion 211a of the front pillar 211 of the third vehicle by a joint (fasteners, welding, etc.). The lower engagement wall 222b may be parallel to the inboard sidewall of the side sill 214 of the third vehicle, and the lower engagement wall 222b may be firmly joined to the side sill 214 of the third vehicle. Accordingly, in the exemplary embodiment illustrated in FIG. 11, the rear connection portion 22 of the rear lower member 13, the front pillar 211, and the side sill 214 may be firmly joined to each other.

FIG. 12 illustrates the rear connection portion 22 of the rear lower member 13 connecting the front pillar 311 and the side sill 314 of the fourth vehicle. Referring to FIG. 12, the rear connection portion 22 of the rear lower member 13 may include an upper engagement wall 322a, a lower engagement wall 322b, and a connection wall 322c having different shapes and different dimensions to those of the corresponding walls illustrated in FIGS. 9, 10, and 11. A portion of the upper engagement wall 322a may be joined to a lower portion of the front pillar 311 of the fourth vehicle, and the lower engagement wall 322b and the connection wall 322c may be joined to the inboard sidewall and the top wall of the side sill 314 of the fourth vehicle. Referring to FIG. 12, the vehicle body structure according to an exemplary embodiment of the present disclosure may further include a reinforcing member 320 interposed between the rear connection portion 22 of the rear lower member 13, the side sill 314, and the front pillar 311. Specifically, the reinforcing member 320 may be interposed between the upper engagement wall 322a of the rear connection portion 22, the side sill 314, and the front pillar 311. In particular, the upper engagement wall 322a of the rear connection portion 22, the side sill 314, and the front pillar 311 may be joined to the reinforcing member 320 by a joint (fasteners, welding, etc.). Accordingly, in the exemplary embodiment illustrated in FIG. 12, the rear connection portion 22 of the rear lower member 13, the front pillar 311, and the side sill 314 may be firmly joined to each other by the reinforcing member 320.

FIG. 13 illustrates the rear connection portion 22 of the rear lower member 13 connecting the front pillar 411 and the side sill 414 of the fifth vehicle. Referring to FIG. 13, the rear connection portion 22 of the rear lower member 13 may include the upper engagement wall 322a, the lower engagement wall 322b, and the connection wall 322c having the same shapes and the same dimensions as those of the corresponding walls illustrated in FIG. 12. A portion of the upper engagement wall 322a may be joined to a lower portion of the front pillar 411 of the fifth vehicle, and the lower engagement wall 322b may be joined to the inboard sidewall of the side sill 414 of the fifth vehicle. Referring to FIG. 13, the vehicle body structure according to an exemplary embodiment of the present disclosure may further include a reinforcing member 330 interposed between the rear connection portion 22 of the rear lower member 13, the side sill 414, and the front pillar 411. Specifically, the reinforcing member 330 may be interposed between a portion of the upper engagement wall 322a of the rear connection portion 22, the connection wall 322c of the rear connection portion 22, a portion of the lower engagement wall 322b of the rear connection portion 22, the side sill 414, and the front pillar 411. The portion of the upper engagement wall 322a, the connection wall 322c, the portion of the lower engagement wall 322b, the side sill 414, and the front pillar 411 may be joined to the reinforcing member 330 by a joint (fasteners, welding, etc.). Accordingly, in the exemplary embodiment illustrated in FIG. 13, the rear connection portion 22 of the rear lower member 13, the front pillar 411, and the side sill 414 may be firmly joined to each other by the reinforcing member 330.

FIG. 14 illustrates the rear connection portion 22 of the rear lower member 13 connecting the front pillar 511 and the side sill 514 of the sixth vehicle. Referring to FIG. 14, the rear connection portion 22 of the rear lower member 13 may include the upper engagement wall 322a, the lower engagement wall 322b, and the connection wall 322c having the same shapes and the same dimensions as those of the corresponding walls illustrated in FIGS. 12 and 13. The upper engagement wall 322a may be joined to a lower portion of the front pillar 511 of the sixth vehicle, and the lower engagement wall 322b may be joined to the inboard sidewall of the side sill 514 of the sixth vehicle. The rear connection portion 22 of the rear lower member 13 may further include a reinforcing rib 22f extending from the lower engagement wall 322b toward the side sill 514. The reinforcing rib 22f may be joined to the top wall of the side sill 514 by a joint (fasteners, welding, etc.). Accordingly, in the exemplary embodiment illustrated in FIG. 14, the rear connection portion 22 of the rear lower member 13 may be additionally connected to the side sill 514 through the reinforcing rib 22f so that connection stiffness between the rear connection portion 22 of the rear lower member 13 and the side sill 514 may be further improved.

Figure 21:
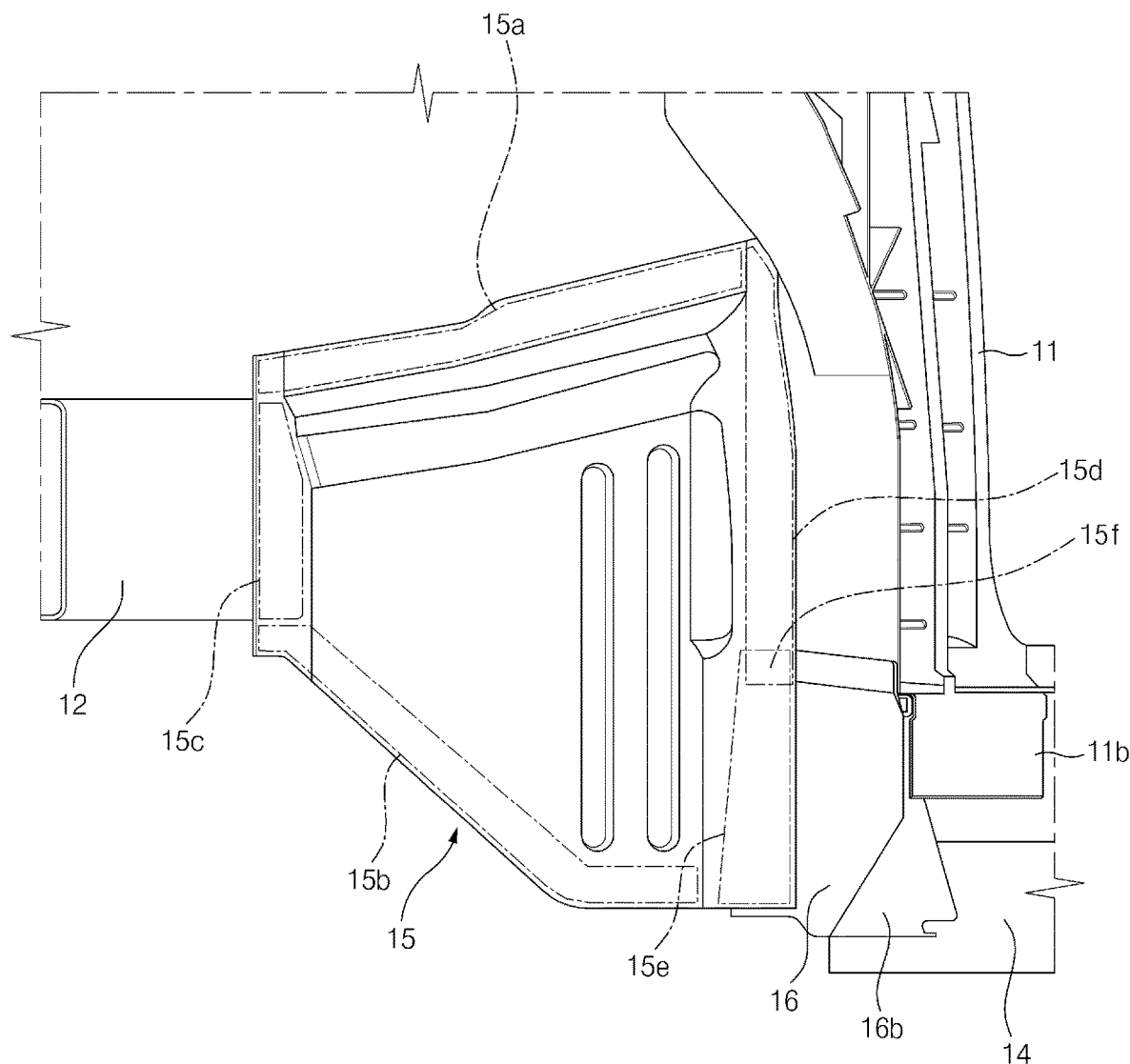
FIG. 21 illustrates a side view of an outer reinforcement of a vehicle body structure according to an exemplary embodiment of the present disclosure.

Referring to FIG. 21, the outer reinforcement 15 may include a top engagement portion 15a extending along a top edge thereof, a bottom engagement portion 15b extending along a bottom edge thereof, and a front engagement portion 15c extending along a front edge thereof.

The top engagement portion 15a may have a flat surface parallel to the top flange 13a of the rear lower member 13, and the top engagement portion 15a may be joined to the top flange 13a of the rear lower member 13 by a joint (fasteners, welding, etc.). The bottom engagement portion 15b may have a flat surface parallel to the bottom flange 13b of the rear lower member 13, and the bottom engagement portion 15b may be joined to the bottom flange 13b of the rear lower member 13 by a joint (fasteners, welding, etc.). The front engagement portion 15c may have a flat surface parallel to the outboard sidewall of the rear portion 12a of the front side member 12, and the front engagement portion 15c may be joined to the rear portion 12a of the front side member 12 by a joint (fasteners, welding, etc.).

Referring to FIG. 21, the outer reinforcement 15 may include a first rear engagement portion 15d and a second rear engagement portion 15e extending along a rear edge thereof. The first rear engagement portion 15d may have a flat surface parallel to the lower portion of the front pillar 11, and the first rear engagement portion 15d may be joined to the lower portion of the front pillar 11 by a joint (fasteners, welding, etc.). The second rear engagement portion 15e may have a flat surface parallel to a front surface of the side sill reinforcement 16, and the second rear engagement portion 15e may be joined to the front surface of the side sill reinforcement 16 by a joint (fasteners, welding, etc.). A bottom portion of the first rear engagement portion 15d and a top portion of the second rear engagement portion 15e may overlap so that an overlap portion 15f may be formed between the first rear engagement portion 15d and the second rear engagement portion 15e.

Figure 22:
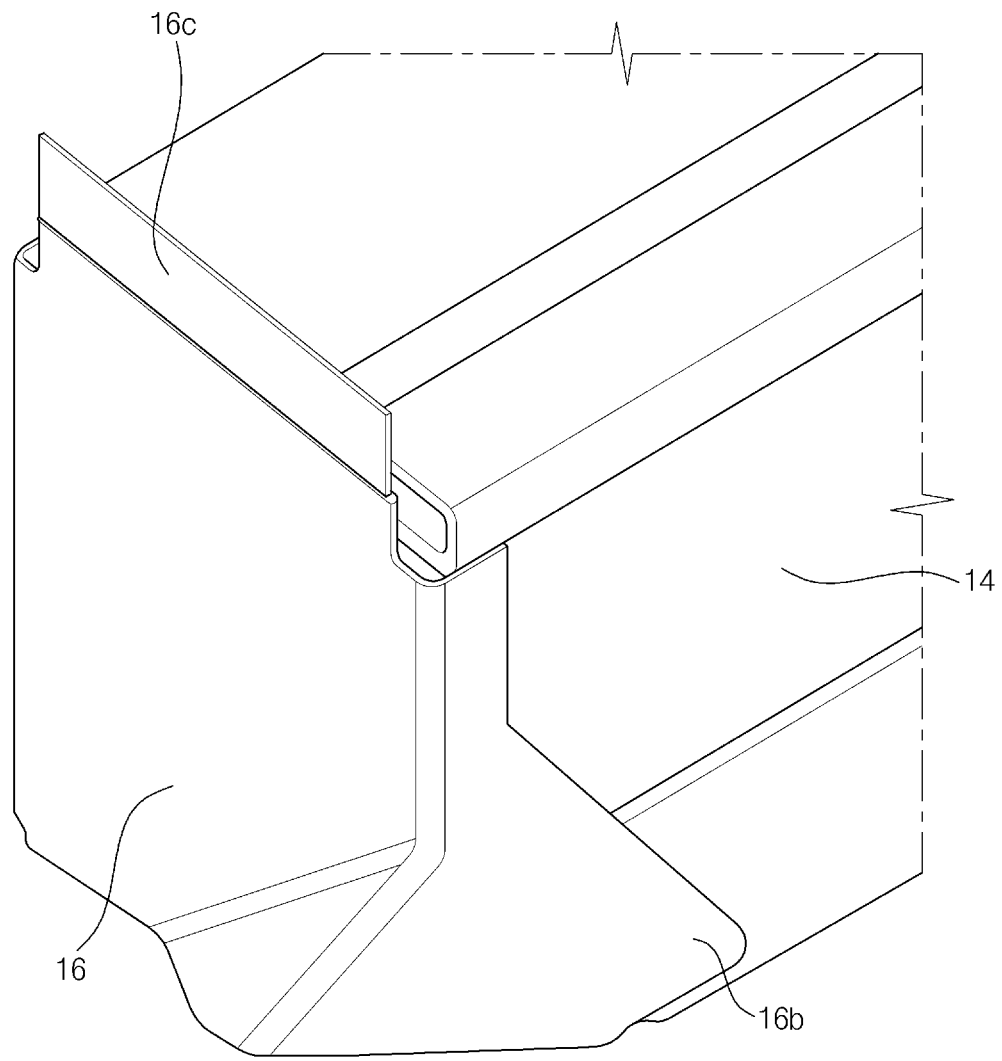
FIG. 22 illustrates a perspective view of the connection of a side sill and a side sill reinforcement in a vehicle body structure according to an exemplary embodiment of the present disclosure.
Figure 23:
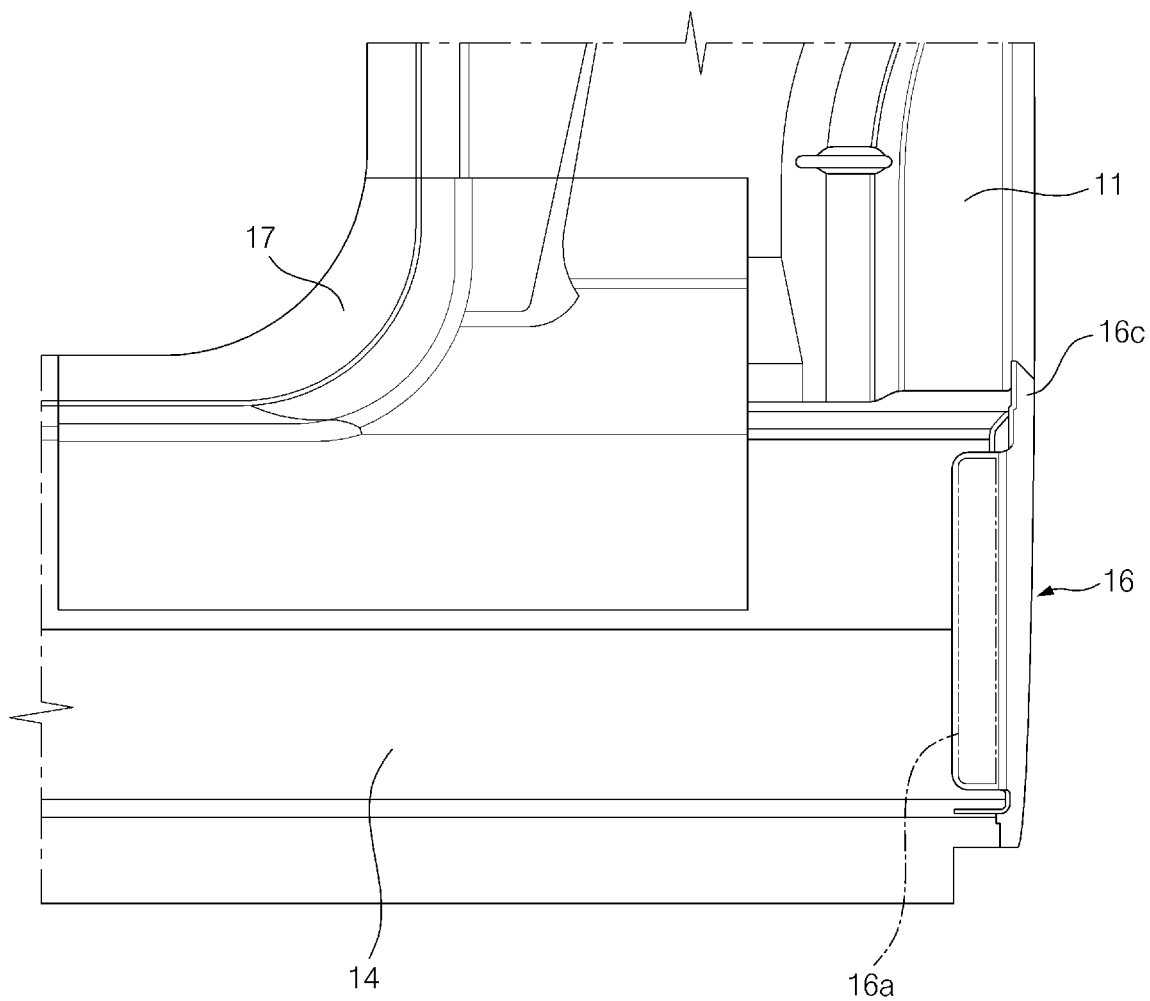
FIG. 23 illustrates the connection of a side sill, a front pillar, and a pillar reinforcement in a vehicle body structure according to an exemplary embodiment of the present disclosure, which is viewed from the interior of the vehicle.

Referring to FIG. 22, the side sill reinforcement 16 may be joined to the open front end of the side sill 14 by a joint (fasteners, welding, etc.) so that the side sill reinforcement 16 may close the open front end of the side sill 14.

Referring to FIGS. 22 to 26, the side sill reinforcement 16 may include a plurality of flanges 16a, 16b, 16f, and 16g joined to the side sill 14. The plurality of flanges 16a, 16b, 16f, and 16g may include an inboard-side flange 16a (see FIG. 23) joined to the inboard sidewall of the side sill 14, an outboard-side flange 16b (see FIGS. 24 and 25) joined to the outboard sidewall of the side sill 14, and two bottom flanges 16f and 16g (see FIG. 26) joined to the bottom wall of the side sill 14. Each of the flanges 16a, 16b, 16f, and 16g may have a flat surface parallel to the corresponding wall of the side sill 14, and the plurality of flanges 16a, 16b, 16f, and 16g may be firmly joined to the side sill 14 by a joint (fasteners, welding, etc.).

Figure 25:
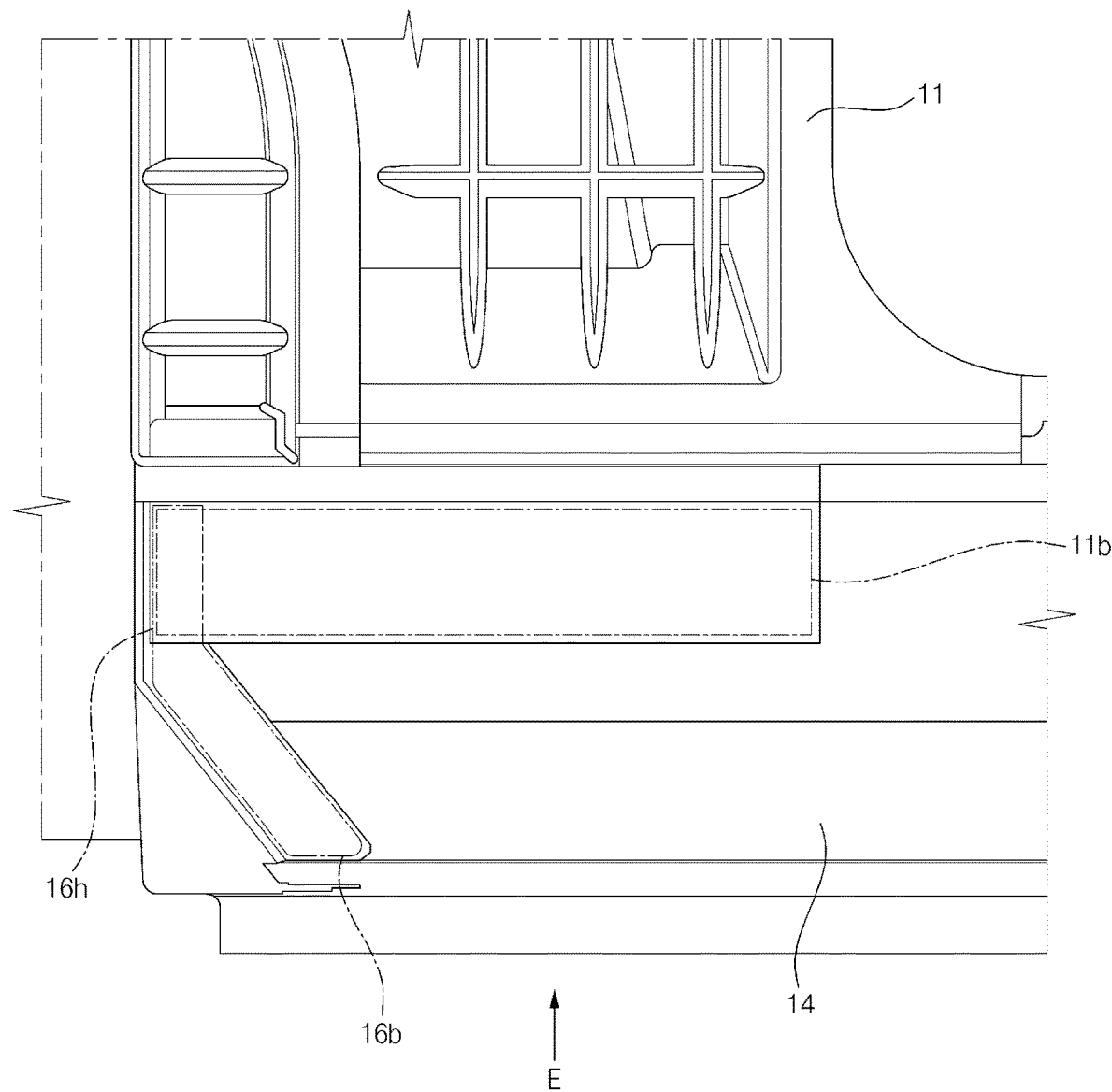
FIG. 25 illustrates the connection of a front pillar, a side sill, and a side sill reinforcement in a vehicle body structure according to an exemplary embodiment of the present disclosure, which is viewed from the exterior of the vehicle.
Figure 26:
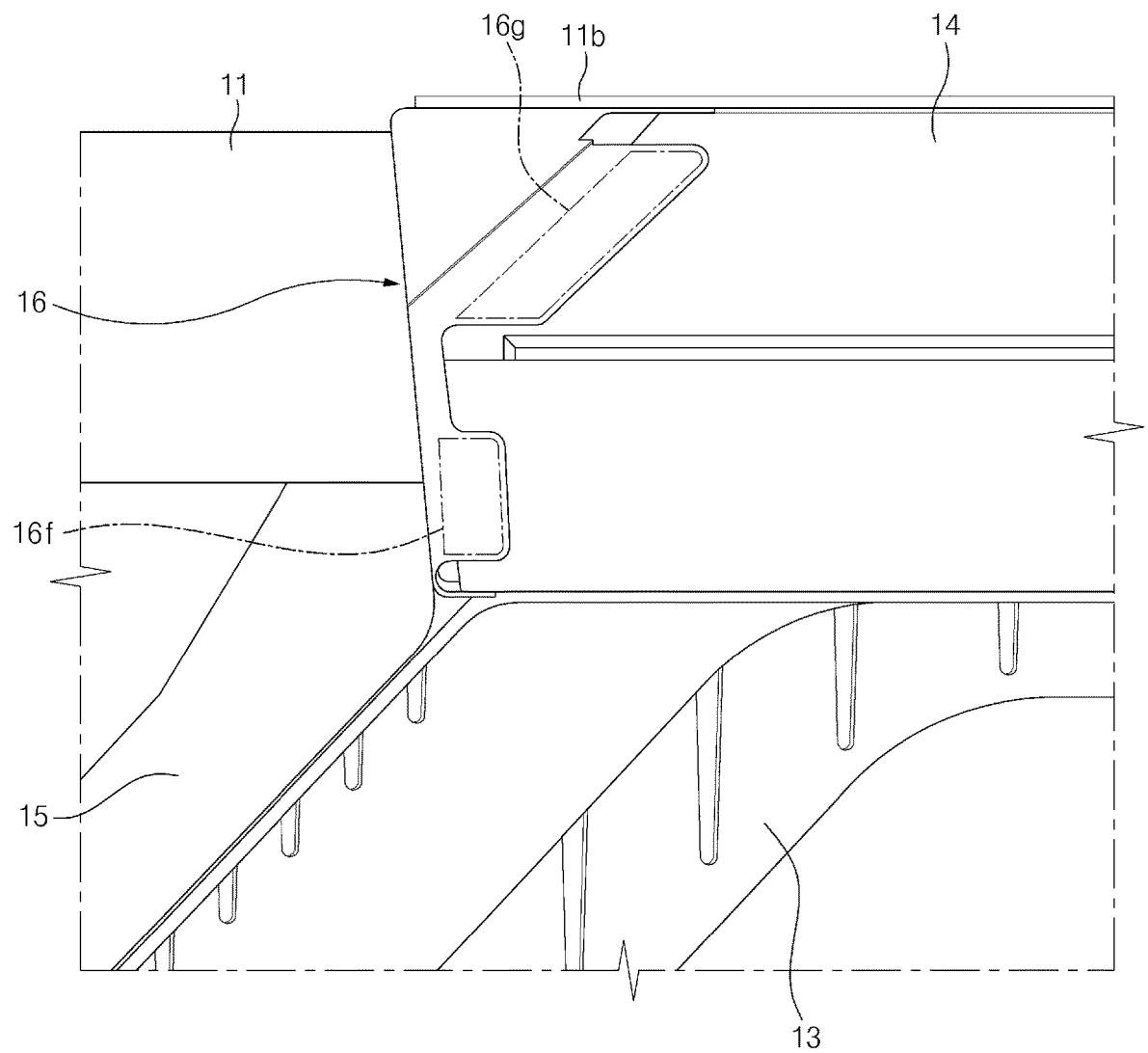
FIG. 26 illustrates a view which is viewed from a direction indicated by arrow E of FIG. 25.

Referring to FIG. 25, the outboard-side flange 16b of the side sill reinforcement 16 may partially overlap the lower engagement portion 11b of the front pillar 11 so that an overlap portion 16h may be formed between the outboard-side flange 16b of the side sill reinforcement 16 and the lower engagement portion 11b of the front pillar 11.

Figure 24:
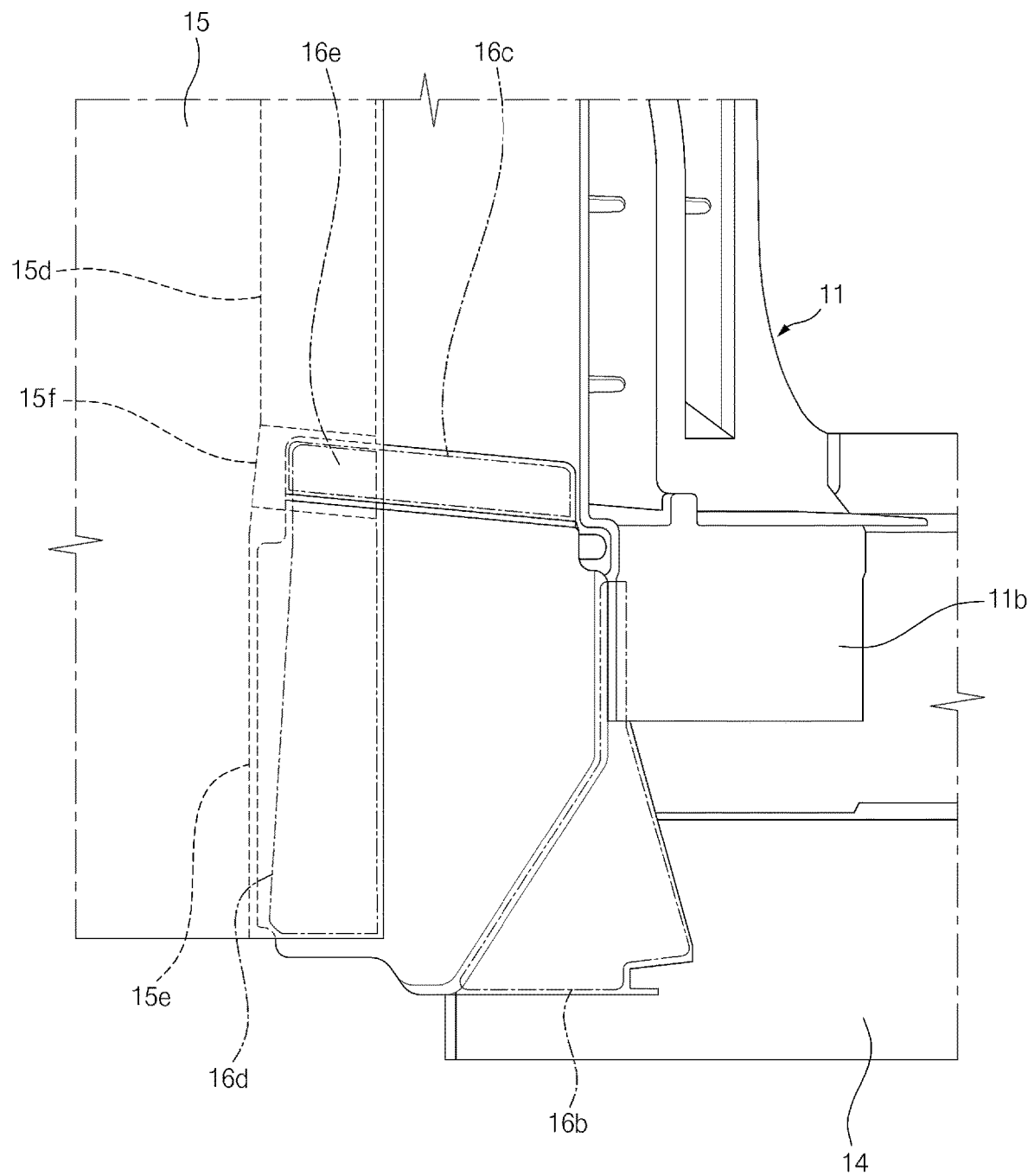
FIG. 24 illustrates a perspective view of the connection of an outer reinforcement, a front pillar, a side sill, and a side sill reinforcement in a vehicle body structure according to an exemplary embodiment of the present disclosure, which is viewed from the front of the vehicle.

The side sill reinforcement 16 may have at least one engagement portion joined to the front pillar 11 and/or the outer reinforcement 15. Referring to FIG. 24, the side sill reinforcement 16 may include a top engagement portion 16c extending along a top edge thereof. The top engagement portion 16c may have a flat surface parallel to a portion of the front pillar 11, and the top engagement portion 16c may be joined to the front pillar 11 by a joint (fasteners, welding, etc.). In addition, the side sill reinforcement 16 may include a front engagement portion 16d joined to the outer reinforcement 15. The front engagement portion 16d may have a flat surface parallel to the rear edge of the outer reinforcement 15, and the front engagement portion 16d may be firmly joined to the outer reinforcement 15 by a joint (fasteners, welding, etc.). The top engagement portion 16c and the front engagement portion 16d may overlap so that an overlap portion 16e may be formed between the top engagement portion 16c and the front engagement portion 16d. In particular, the front engagement portion 16d of the side sill reinforcement 16 may be aligned with the second rear engagement portion 15e of the outer reinforcement 15, and the overlap portion 16e of the side sill reinforcement 16 may be aligned with the overlap portion 15f of the outer reinforcement 15.

Figure 27:
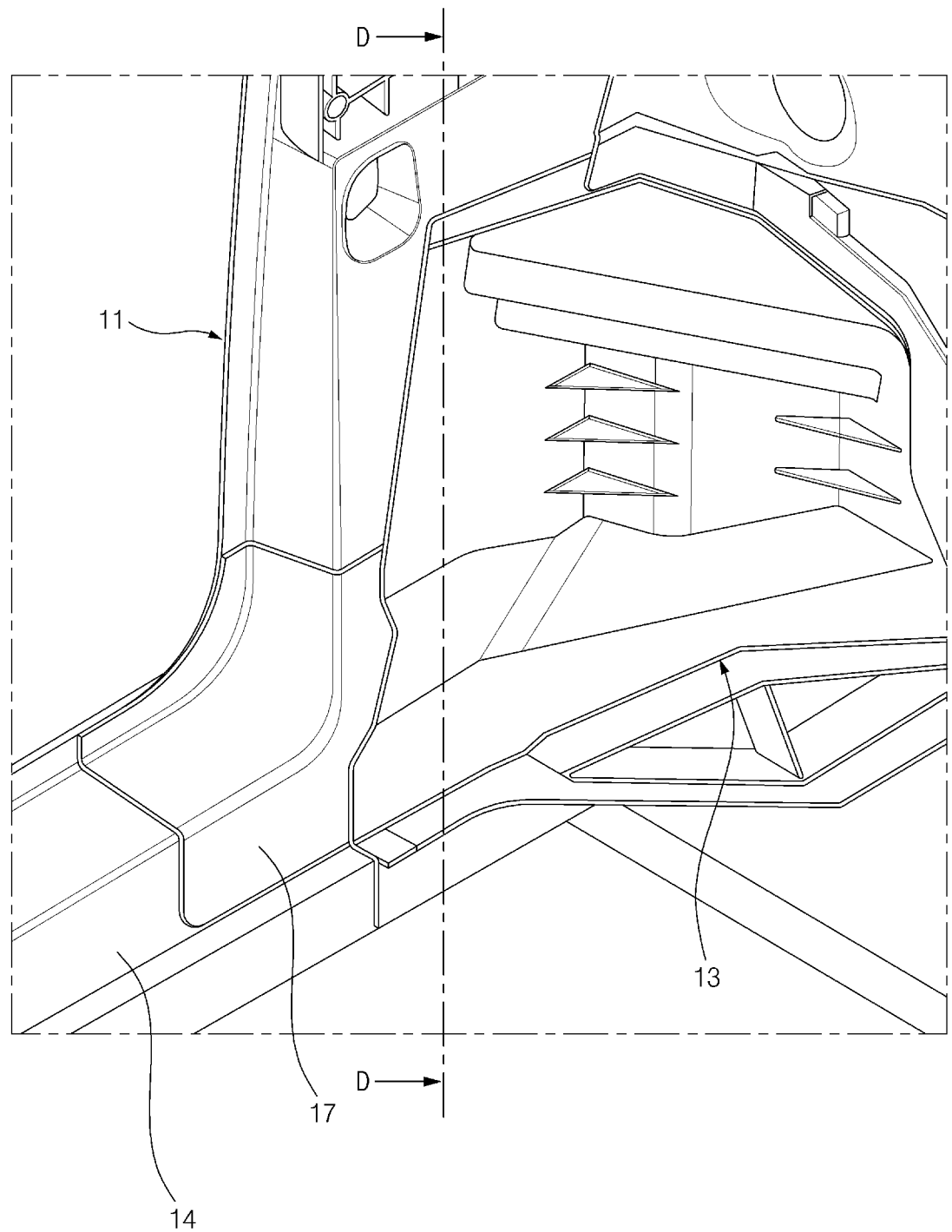
FIG. 27 illustrates a perspective view of the connection of a front pillar, a side sill, a rear lower member, and a pillar reinforcement in a vehicle body structure according to an exemplary embodiment of the present disclosure, which is viewed from the interior of the vehicle.

Referring to FIG. 27, the pillar reinforcement 17 may be joined to the inboard-side lower portion of the front pillar 11, and the pillar reinforcement 17 may have at least one engagement portion joined to at least one of the side sill 14 and the rear lower member 13.

Figure 28:
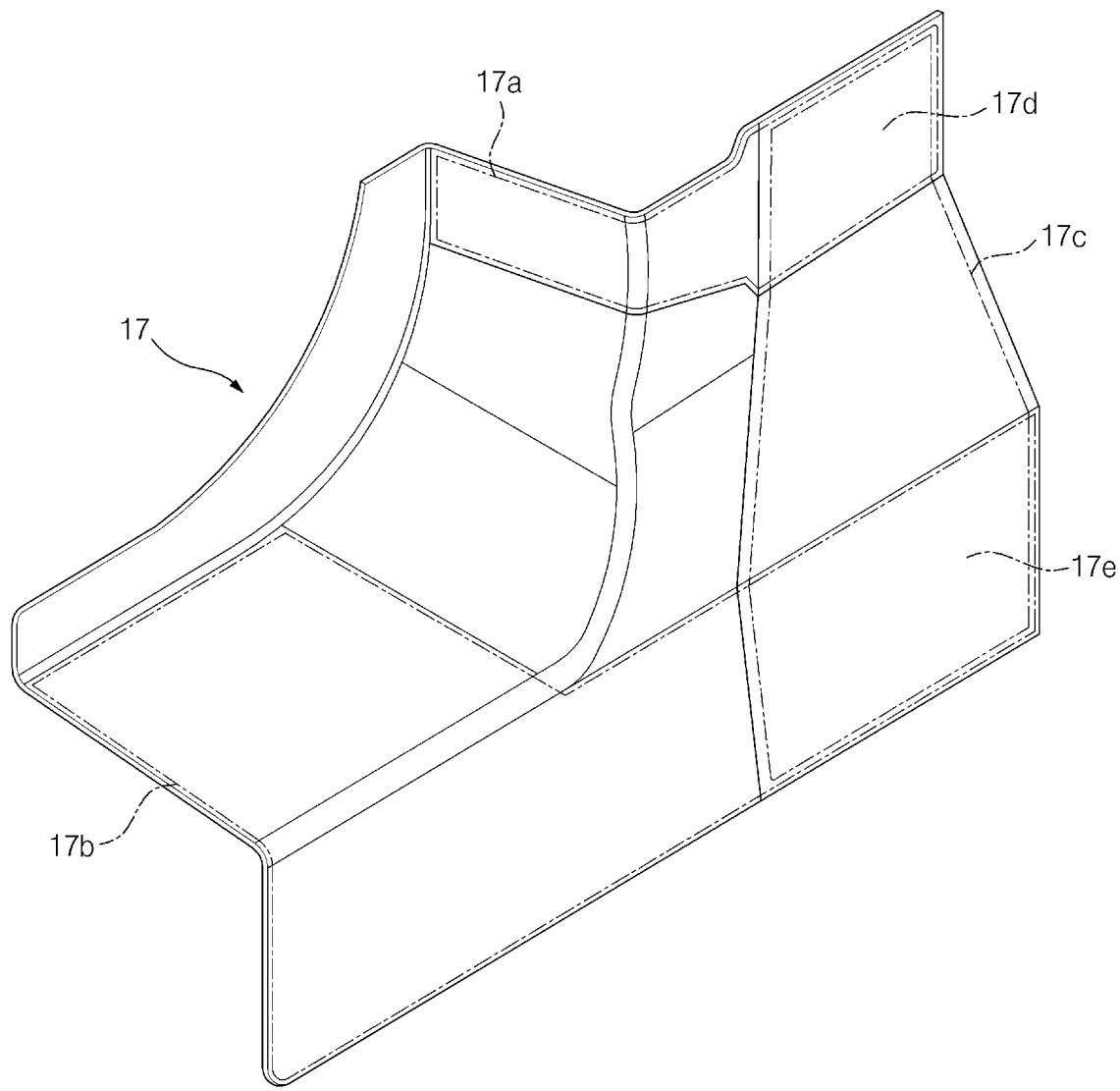
FIG. 28 illustrates a perspective view of a pillar reinforcement of a vehicle body structure according to an exemplary embodiment of the present disclosure.

Referring to FIGS. 27 and 28, the pillar reinforcement 17 may include a top engagement portion 17a joined to the lower portion of the front pillar 11, a bottom engagement portion 17b joined to the front portion of the side sill 14, and an inboard-side engagement portion 17c joined to the rear connection portion 22 of the rear lower member 13.

The top engagement portion 17a may have a shape matching the lower portion of the front pillar 11. The top engagement portion 17a may have a plurality of flat surfaces parallel to the lower portion of the front pillar 11, and the top engagement portion 17a may be firmly joined to the lower portion of the front pillar 11 by a joint (fasteners, welding, etc.).

The bottom engagement portion 17b may have a shape matching the front portion of the side sill 14. The bottom engagement portion 17b may have a plurality of flat surfaces parallel to the walls of the side sill 14, and the bottom engagement portion 17b may be firmly joined to the front portion of the side sill 14 by a joint (fasteners, welding, etc.).

The inboard-side engagement portion 17c may have a shape matching the rear connection portion 22 of the rear lower member 13. The inboard-side engagement portion 17c may have a plurality of flat surfaces parallel to the rear connection portion 22 of the rear lower member 13, and the inboard-side engagement portion 17c may be firmly joined to the rear connection portion 22 of the rear lower member 13 by a joint (fasteners, welding, etc.).

Figure 29:
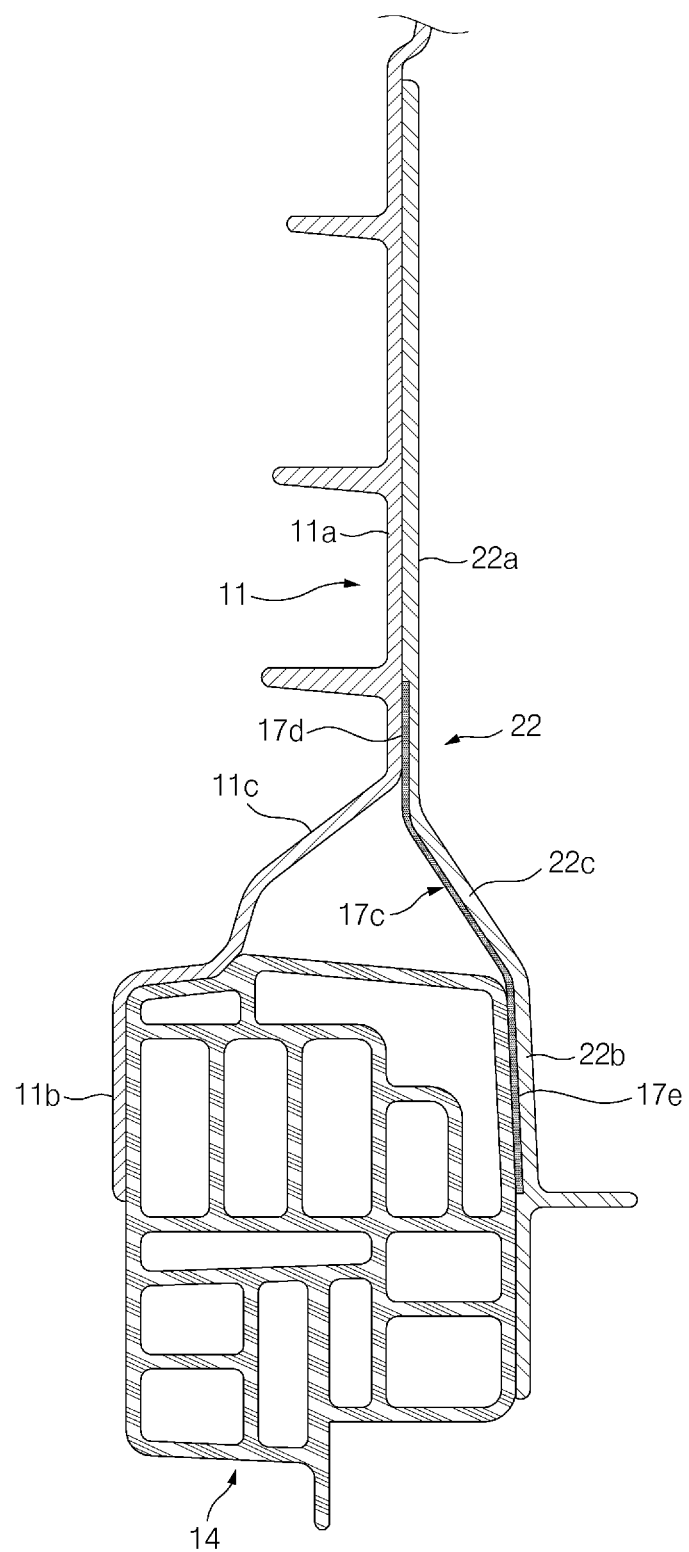
FIG. 29 illustrates a cross-sectional view, taken along line D-D of FIG. 27.

Referring to FIG. 28, the inboard-side engagement portion 17c may include a first overlap portion 17d which is overlapped by the top engagement portion 17a, and a second overlap portion 17e which is overlapped by the bottom engagement portion 17b. Referring to FIG. 29, the first overlap portion 17d may be interposed between the upper engagement portion 11a of the front pillar 11 and the upper engagement wall 22a of the rear connection portion 22 of the rear lower member 13, and the second overlap portion 17e may be interposed between the lower engagement wall 22b of the rear connection portion 22 of the rear lower member 13 and the side sill 14.

As the first overlap portion 17d of the inboard-side engagement portion 17c is interposed between the front pillar 11 and the rear lower member 13, connection stiffness between the front pillar 11 and the rear lower member 13 may be improved, and as the second overlap portion 17e of the inboard-side engagement portion 17c is interposed between the rear lower member 13 and the side sill 14, connection stiffness between the rear lower member 13 and the side sill 14 may be improved.

The front pillar 11, the front side member 12, the rear lower member 13, the side sill 14, the outer reinforcement 15, the side sill reinforcement 16, and the pillar reinforcement 17 may be joined by various joints. According to an exemplary embodiment, the joints may be any one of friction element welding (FEW), RIVTAC, blind rivets, bolting, self-piercing rivets (SPR), resistance element welding (REW), clinching, and spot welding using steel or aluminum.

Figure 30:
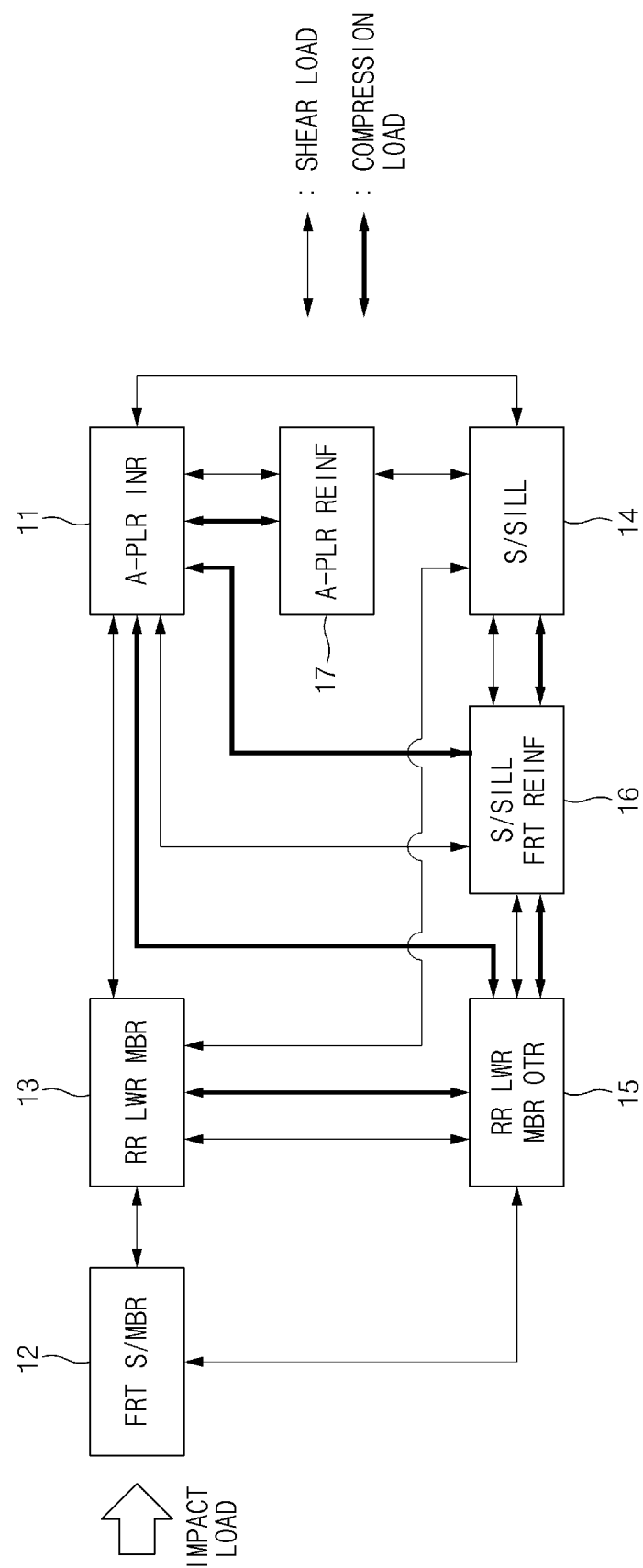
FIG. 30 illustrates the transfer of loads in a vehicle body structure according to an exemplary embodiment of the present disclosure when a front collision of the vehicle occurs.

Referring to FIG. 30, in the event of a frontal collision of the vehicle, an impact load may be sequentially transferred to the rear lower member 13, the front pillar 11, and the side sill 14 through the front side member 12. A shear load may act between the front side member 12 and the rear lower member 13, act between the rear lower member 13 and the front pillar 11, act between the front pillar 11 and the side sill 14, and act between the front side member 12 and the outer reinforcement 15. A shear load and a compression load may act together between the rear lower member 13 and the outer reinforcement 15, act together between the outer reinforcement 15 and the side sill reinforcement 16, act together between the side sill reinforcement 16 and the side sill 14, act together between the front pillar 11 and the pillar reinforcement 17, and act together between the front pillar 11 and the side sill reinforcement 16. A shear load may act between the pillar reinforcement 17 and the side sill 14, and act between the rear lower member 13 and the side sill 14.

Figure 31:
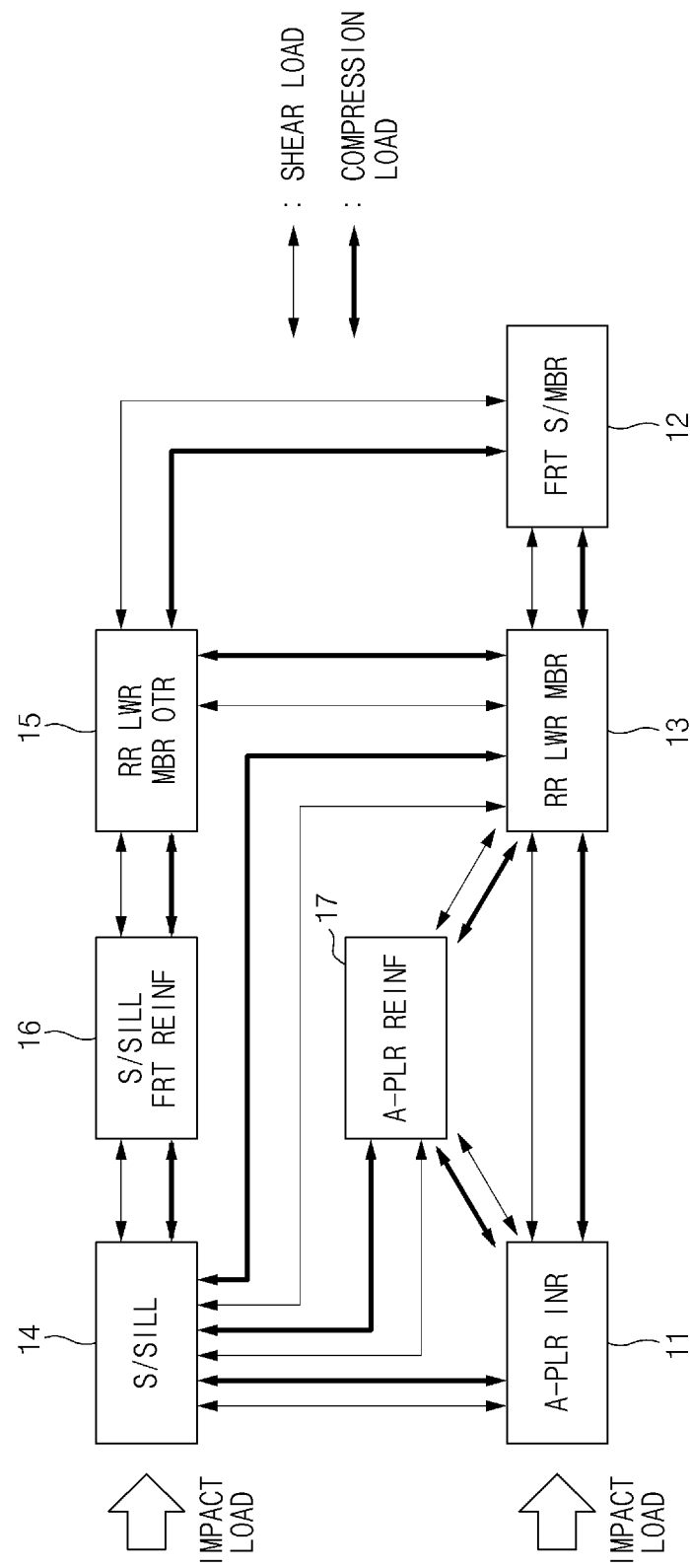
FIG. 31 illustrates the transfer of loads in a vehicle body structure according to an exemplary embodiment of the present disclosure when a side collision of the vehicle occurs.

Referring to FIG. 31, in the event of a side collision of the vehicle, an impact load may be transferred from the side sill 14 and the front pillar 11 to the front side member 12 through the rear lower member 13. A shear load and a compression load may act together between the side sill 14 and the side sill reinforcement 16, act together between the side sill reinforcement 16 and the outer reinforcement 15, act together between the outer reinforcement 15 and the front side member 12, act together between the front side member 12 and the rear lower member 13, act together between the outer reinforcement 15 and the rear lower member 13, act together between the rear lower member 13 and the side sill 14, act together between the rear lower member 13 and the pillar reinforcement 17, act together between the rear lower member 13 and the front pillar 11, act together between the front pillar 11 and the pillar reinforcement 17, and act together between the pillar reinforcement 17 and the side sill 14.

As described above, the vehicle body structure according to an exemplary embodiment of the present disclosure may achieve improved connection stiffness using the plurality of structural members 11, 12, 13, and 14 and the plurality of connection members 15, 16, and 17. Accordingly, the impact load may be uniformly distributed in the event of a frontal collision and a side collision, and the stiffness of the vehicle body may be reliably maintained.

Each of the connection members 15, 16, and 17 may be manufactured by various methods as shown in table 1 below.

TABLE 1

|  | Steel Pressing | Aluminum Pressing | Aluminum Extrusion | High Vacuum Die-casting | Low Pressure Casting |
| --- | --- | --- | --- | --- | --- |
| Pillar Reinforcement | ○ | ○ | ○ | ○ | ○ |
| Outer Reinforcement | ○ | ○ | x | ○ | ○ |
| Side Sill Reinforcement | ○ | ○ | x | ○ | ○ |

For example, when the pillar reinforcement 17 is manufactured by aluminum extrusion, the outer reinforcement 15 and the side sill reinforcement 16 may be manufactured by steel pressing. The plurality of connection members 15, 16, and 17 may be manufactured by combining a maximum of 150 methods (6×5×5) based on table 1.

As set forth above, the vehicle body structure according to exemplary embodiments of the present disclosure may be capable of improving the stiffness of the vehicle body by firmly connecting the front side member, the front pillar, and the side sill. In particular, the vehicle body structure may include the rear lower member which is designed to fit the front pillar and the side sill for different models of vehicles in the same assembly position using the same assembly method, and thus the manufacturing cost of the vehicle may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body structure, comprising:
   a front pillar;
   a front side member located in front of the front pillar and extending in a longitudinal direction of a vehicle;
   a side sill connected to a bottom end of the front pillar; and
   a rear lower member connecting the front side member, the side sill, and the front pillar,
   wherein the rear lower member includes a front connection portion connected to a rear portion of the front side member, a rear connection portion connected to a lower portion of the front pillar and a front portion of the side sill, and an upper connection portion connecting the front side member and the front pillar,
   wherein the rear connection portion includes an upper engagement wall joined to the front pillar, and a lower engagement wall joined to the side sill, and
   wherein the upper connection portion includes a plurality of upper ribs extending between the front side member and the front pillar in the longitudinal direction of the vehicle.

2. The vehicle body structure according to claim 1, wherein the upper engagement wall and the lower engagement wall have a same shape and a same dimension.

3. The vehicle body structure according to claim 1, wherein the front connection portion has two or more walls matching at least two walls of the front side member.

4. The vehicle body structure according to claim 1, wherein the rear lower member further includes a lower connection portion connecting the front side member and the side sill.

5. The vehicle body structure according to claim 4, wherein the lower connection portion includes a plurality of lower ribs extending between the front side member and the side sill in the longitudinal direction of the vehicle.

6. The vehicle body structure according to claim 1, wherein:
   the side sill has a closed cross section in which a plurality of cavities are defined,
   the lower engagement wall of the rear lower member is joined to an inboard sidewall of the side sill, and
   at least a portion of the inboard sidewall and at least a portion of a bottom wall of the side sill have a common area having the same shape and the same dimension.

7. The vehicle body structure according to claim 1, wherein the front pillar includes an upper engagement portion joined to the upper engagement wall of the rear lower member, and a lower engagement portion joined to a top wall and an outboard sidewall of the side sill.

8. The vehicle body structure according to claim 7, wherein the lower engagement portion has an L-shaped cross section matching the top wall and the outboard sidewall of the side sill.

9. The vehicle body structure according to claim 1, further comprising an outer reinforcement joined to the rear lower member to cover an outboard side of the rear lower member, wherein the rear lower member has flanges joined to edges of the outer reinforcement.

10. The vehicle body structure according to claim 9, wherein the outer reinforcement includes a front engagement portion joined to the rear portion of the front side member.

11. The vehicle body structure according to claim 9, further comprising a side sill reinforcement closing an open front end of the side sill,
wherein the side sill reinforcement has at least one engagement portion joined to at least one of the outer reinforcement and the front pillar.

12. The vehicle body structure according to claim 11, wherein the outer reinforcement includes a first rear engagement portion joined to the front pillar and a second rear engagement portion joined to the side sill reinforcement, and
the first rear engagement portion and the second rear engagement portion partially overlap.

13. The vehicle body structure according to claim 11, wherein the side sill reinforcement includes a plurality of flanges joined to the side sill, a top engagement portion joined to the front pillar, and a front engagement portion joined to the outer reinforcement, and
the top engagement portion and the front engagement portion partially overlap.

14. The vehicle body structure according to claim 1, further comprising a pillar reinforcement joined to the lower portion of the front pillar,
wherein the pillar reinforcement has at least one engagement portion joined to at least one of the side sill and the rear lower member.

15. The vehicle body structure according to claim 14, wherein the pillar reinforcement includes a top engagement portion joined to the lower portion of the front pillar, a bottom engagement portion joined to the side sill, and an inboard-side engagement portion joined to the rear lower member.

16. The vehicle body structure according to claim 15, wherein the inboard-side engagement portion includes a first overlap portion which is overlapped by the top engagement portion, and a second overlap portion which is overlapped by the bottom engagement portion,
the first overlap portion is interposed between the upper engagement portion of the front pillar and the upper engagement wall of the rear lower member, and
the second overlap portion is interposed between the lower engagement wall of the rear lower member and the side sill.

17. The vehicle body structure according to claim 1, further comprising a reinforcing member interposed between the upper engagement wall of the rear connection portion, the side sill, and the front pillar.

18. The vehicle body structure according to claim 1, wherein the rear connection portion further includes a connection wall connecting the upper engagement wall and the lower engagement wall.

19. The vehicle body structure according to claim 18, further comprising a reinforcing member interposed between a portion of the upper engagement wall of the rear connection portion, the connection wall of the rear connection portion, a portion of the lower engagement wall of the rear connection portion, the side sill, and the front pillar.

20. The vehicle body structure according to claim 1, wherein the rear connection portion of the rear lower member further includes a reinforcing rib extending from the lower engagement wall toward the side sill, and
the reinforcing rib is joined to a top wall of the side sill.

* * * * *